United States Patent
Hunter et al.

(10) Patent No.: US 6,647,417 B1
(45) Date of Patent: Nov. 11, 2003

(54) MUSIC DISTRIBUTION SYSTEMS

(75) Inventors: Charles Eric Hunter, Hilton Head Island, SC (US); Kelly C. Sparks, Raleigh, NC (US); John H. Hebrank, Durham, NC (US)

(73) Assignee: World Theatre, Inc., Morrisville, NC (US)

( * ) Notice: Subject to any disclaimer, the term of this patent is extended or adjusted under 35 U.S.C. 154(b) by 0 days.

(21) Appl. No.: 09/502,069

(22) Filed: Feb. 10, 2000

(51) Int. Cl.[7] .............................................. G06F 15/173
(52) U.S. Cl. ...................... 709/225; 709/226; 709/229; 705/14; 705/26
(58) Field of Search ................................ 709/225, 226, 709/229; 705/26, 14

(56) References Cited

U.S. PATENT DOCUMENTS

| | | |
|---|---|---|
| 3,373,517 A | 3/1968 | Halperin |
| 3,376,465 A | 4/1968 | Corpew |
| 3,848,193 A | 11/1974 | Martin ........................ 325/53 |
| 3,941,926 A | 3/1976 | Slobodzian et al. .......... 178/7.3 |
| 3,983,317 A | 9/1976 | Glorioso ..................... 178/6.6 |
| 3,993,955 A | 11/1976 | Belcher et al. ............. 325/308 |
| 4,094,010 A | 6/1978 | Pepperl et al. .............. 365/215 |
| 4,155,042 A | 5/1979 | Permut et al. ................ 325/64 |
| 4,332,022 A | 5/1982 | Ceshkovsky et al. ......... 369/44 |
| 4,368,485 A | 1/1983 | Midland ..................... 358/64 |
| 4,476,488 A | 10/1984 | Merrell ....................... 358/86 |
| 4,536,791 A | 8/1985 | Campbell et al. ............ 358/122 |
| 4,559,480 A | 12/1985 | Nobs .......................... 315/324 |
| 4,575,750 A | 3/1986 | Callahan ..................... 358/86 |

(List continued on next page.)

FOREIGN PATENT DOCUMENTS

| | | | | |
|---|---|---|---|---|
| EP | 0 683 943 B1 | 11/1993 | ............. | H04H/1/00 |
| EP | 0 756 423 A1 | 1/1997 | ............. | H04N/7/173 |
| EP | 0 954 176 A2 | 11/1999 | ............. | H04N/7/16 |
| EP | 0 954 179 A2 | 11/1999 | ............. | H04N/7/173 |
| EP | 0 975 111 A2 | 1/2000 | ............. | H04H/9/00 |

(List continued on next page.)

OTHER PUBLICATIONS

US 5,825,354, 10/1998, Ahmad et al. (withdrawn)
"Wink Television Press Room," http://www.wink.com/contents/PressReleases.shtml, downloaded and printed on May 14, 2002.

(List continued on next page.)

*Primary Examiner*—Saleh Najjar
(74) *Attorney, Agent, or Firm*—Finnegan, Henderson, Farabow, Garrett & Dunner, LLP

(57) ABSTRACT

Music is blanket transmitted (for example, via satellite downlink transmission) to each customer's computer-based user station. Customers preselect from a list of available music in advance using an interactive screen selector, and pay only for music that they choose to have recorded for unlimited playback, for example, by a "CD burner". An antipiracy "ID tag" is woven into the recorded music so that any illegal copies therefrom may be traced to the purchase transaction. Music is transmitted on a fixed schedule or through an active scheduling process that monitors music requests from all or a subset of satellite receivers and adjust scheduling according to demand for various CD's. Receivers store selections that are likely to be preferred by a specific customer. In those instances where weather conditions, motion atmospheric layers or dish obstructions result in data loss, the system downloads the next transmission of the requested CD and uses both transmissions to produce a "good copy". In conjunction with the blanket transmission of more popular music, an automated CD manufacturing facility may be provided to manufacture CD's that are not frequently requested and distribute them by ground transportation.

33 Claims, 15 Drawing Sheets

U.S. PATENT DOCUMENTS

| | | | |
|---|---|---|---|
| 4,595,950 A | 6/1986 | Lofberg | 358/122 |
| 4,654,482 A | 3/1987 | DeAngelis | 379/95 |
| 4,716,410 A | 12/1987 | Nozaki | 340/825.52 |
| 4,734,779 A | 3/1988 | Levis et al. | 358/231 |
| 4,734,858 A | 3/1988 | Schlafly | 364/408 |
| 4,761,641 A | 8/1988 | Schreiber | 340/717 |
| 4,789,863 A | 12/1988 | Bush | |
| 4,797,913 A | 1/1989 | Kaplan et al. | 379/91 |
| 4,809,325 A | 2/1989 | Hayashi et al. | |
| 4,812,843 A | 3/1989 | Champion, III et al. | 340/905 |
| 4,829,569 A | 5/1989 | Seth-Smith et al. | 380/10 |
| 4,847,825 A | 7/1989 | Levine | 369/47 |
| 4,862,268 A | 8/1989 | Campbell et al. | 358/141 |
| 4,908,713 A | 3/1990 | Levine | 358/335 |
| 4,949,187 A | 8/1990 | Cohen | 358/335 |
| 5,046,090 A | 9/1991 | Walker et al. | 380/5 |
| 5,051,822 A | 9/1991 | Rhoades | 358/86 |
| 5,073,925 A | 12/1991 | Nagata et al. | 380/3 |
| 5,107,107 A | 4/1992 | Osborne | 250/231.14 |
| 5,121,430 A | 6/1992 | Ganzer et al. | 380/48 |
| 5,123,046 A | 6/1992 | Levine | 380 |
| 5,133,079 A | 7/1992 | Ballantyne et al. | 455/4.1 |
| 5,182,669 A | 1/1993 | Chikuma et al. | 359/241 |
| 5,191,573 A | 3/1993 | Hair | 369/84 |
| 5,214,793 A | 5/1993 | Conway et al. | 455/49.1 |
| 5,233,423 A | 8/1993 | Jernigan et al. | 358/181 |
| 5,235,587 A | 8/1993 | Bearden et al. | 369/106 |
| 5,251,193 A | 10/1993 | Nelson et al. | 369/44.12 |
| 5,257,017 A | 10/1993 | Jones et al. | 345/13 |
| 5,260,778 A | 11/1993 | Kauffman et al. | 358/86 |
| 5,274,762 A | 12/1993 | Peterson et al. | 395/200 |
| 5,283,731 A | 2/1994 | LaLonde et al. | 364/401 |
| 5,297,204 A | 3/1994 | Levine | 380/10 |
| 5,311,423 A | 5/1994 | Clark | 364/401 |
| 5,319,735 A | 6/1994 | Preuss et al. | 395/2.14 |
| 5,355,302 A | 10/1994 | Martin et al. | 364/410 |
| 5,365,282 A | 11/1994 | Levine | 348/734 |
| 5,373,330 A | 12/1994 | Levine | 348/734 |
| 5,414,756 A | 5/1995 | Levine | 379/67 |
| 5,418,713 A | 5/1995 | Allen | 364/403 |
| 5,420,647 A | 5/1995 | Levine | 348/734 |
| 5,420,923 A | 5/1995 | Beyers, II et al. | 380/20 |
| 5,428,606 A | 6/1995 | Moskowitz | 370/60 |
| 5,438,355 A | 8/1995 | Palmer | |
| 5,465,291 A | 11/1995 | Barrus et al. | 379/67 |
| 5,469,020 A | 11/1995 | Herrick | 313/511 |
| 5,469,206 A | 11/1995 | Strubbe et al. | |
| 5,473,584 A | 12/1995 | Oshima | 369/32 |
| 5,486,819 A | 1/1996 | Horie | 340/905 |
| 5,495,283 A | 2/1996 | Cowe | 348/9 |
| 5,497,186 A | 3/1996 | Kawasaki | 348/6 |
| 5,497,479 A | 3/1996 | Hornbuckle | 395/491 |
| 5,508,815 A | 4/1996 | Levine | 358/335 |
| 5,512,935 A | 4/1996 | Majeti et al. | 348/9 |
| 5,513,260 A | 4/1996 | Ryan | 380/3 |
| 5,530,751 A | 6/1996 | Morris | 380/4 |
| 5,532,920 A | 7/1996 | Hartrick et al. | 364/419.1 |
| 5,543,856 A | 8/1996 | Rosser et al. | 348/578 |
| 5,557,541 A | 9/1996 | Schulhof et al. | 364/514 |
| 5,559,549 A | 9/1996 | Hendricks et al. | 348/6 |
| 5,565,909 A | 10/1996 | Thibadeau et al. | 348/9 |
| 5,568,272 A | 10/1996 | Levine | 386/48 |
| 5,592,511 A | 1/1997 | Schoen et al. | 375/220 |
| 5,592,551 A | 1/1997 | Lett et al. | 380/20 |
| 5,592,626 A | 1/1997 | Papadimitriou et al. | 395/200.09 |
| 5,600,839 A | 2/1997 | MacDonald | 395/750 |
| 5,610,653 A | 3/1997 | Abecassis | |
| 5,612,741 A | 3/1997 | Loban et al. | 348/383 |
| 5,619,247 A | 4/1997 | Russo | 348/3 |
| 5,621,840 A | 4/1997 | Kawamura et al. | |
| 5,621,863 A | 4/1997 | Boulet et al. | 395/124 |
| 5,627,895 A | 5/1997 | Owaki | 380/54 |
| 5,628,050 A | 5/1997 | McGraw et al. | 455/12.1 |
| 5,630,067 A | 5/1997 | Kindell et al. | 395/200.09 |
| 5,638,113 A | 6/1997 | Lappington et al. | 348/12 |
| 5,640,453 A | 6/1997 | Schuchman et al. | 380/10 |
| 5,644,859 A | 7/1997 | Hsu | 40/545 |
| 5,646,603 A | 7/1997 | Nagata et al. | 340/825.25 |
| 5,646,997 A | 7/1997 | Barton | 380/23 |
| 5,654,747 A | 8/1997 | Ottesen et al. | 348/12 |
| 5,659,366 A | 8/1997 | Kerman | 348/460 |
| 5,659,613 A | 8/1997 | Copeland et al. | 380/3 |
| 5,661,516 A | 8/1997 | Carles | 348/8 |
| 5,664,018 A | 9/1997 | Leighton | 380/54 |
| 5,675,734 A | 10/1997 | Hair | 395/200.01 |
| 5,684,918 A | 11/1997 | Abecassis | 386/83 |
| 5,686,954 A | 11/1997 | Yoshinobu et al. | 348/13 |
| 5,689,799 A | 11/1997 | Dougherty et al. | 455/2 |
| 5,692,214 A | 11/1997 | Levine | 395/833 |
| 5,701,161 A | 12/1997 | Williams et al. | 348/468 |
| 5,701,383 A | 12/1997 | Russo et al. | 386/46 |
| 5,701,397 A | 12/1997 | Steimle et al. | 395/27 |
| 5,710,869 A | 1/1998 | Godefray et al. | 395/21 |
| 5,717,814 A | 2/1998 | Abecassis | 386/46 |
| 5,717,832 A | 2/1998 | Steimle et al. | 395/24 |
| 5,721,827 A | 2/1998 | Logan et al. | 395/200.47 |
| 5,721,951 A | 2/1998 | DorEl | 395/830 |
| 5,724,062 A | 3/1998 | Hunter | 345/102 |
| 5,724,091 A | 3/1998 | Freeman et al. | 348/13 |
| 5,724,525 A | 3/1998 | Beyers, II et al. | 395/240 |
| 5,729,214 A | 3/1998 | Moore | |
| 5,734,413 A | 3/1998 | Lappington et al. | 348/12 |
| 5,740,326 A | 4/1998 | Boulet et al. | 395/27 |
| 5,748,716 A | 5/1998 | Levine | 379/102.03 |
| 5,758,257 A | 5/1998 | Herz et al. | 455/2 |
| 5,760,820 A | 6/1998 | Eda et al. | 348/9 |
| 5,761,606 A | 6/1998 | Wolzien | 455/6.2 |
| 5,781,734 A | 7/1998 | Ohno et al. | 395/200.47 |
| 5,790,202 A | 8/1998 | Kummer et al. | 348/553 |
| 5,790,937 A | 8/1998 | Gutle | 455/6.3 |
| 5,799,285 A | 8/1998 | Klingman | 705/26 |
| 5,805,154 A | 9/1998 | Brown | 345/327 |
| 5,805,763 A | 9/1998 | Lawler et al. | 386/83 |
| 5,809,139 A | 9/1998 | Girod et al. | 380/5 |
| 5,818,806 A | 10/1998 | Wong et al. | 369/59 |
| 5,822,432 A | 10/1998 | Moskowitz et al. | 380/28 |
| 5,825,407 A | 10/1998 | Cowe et al. | 348/6 |
| 5,826,123 A | 10/1998 | Lai | 396/446 |
| RE35,954 E | 11/1998 | Levine | 380/10 |
| 5,832,287 A | 11/1998 | Atalla | 395/800 |
| 5,835,896 A | 11/1998 | Fisher et al. | 705/37 |
| 5,841,979 A | 11/1998 | Schulhof et al. | 395/200.67 |
| 5,845,083 A | 12/1998 | Hamadani et al. | 395/200.61 |
| 5,848,129 A | 12/1998 | Baker | 379/67 |
| 5,848,155 A | 12/1998 | Cox | 380/4 |
| 5,848,352 A | 12/1998 | Dougherty et al. | 455/5.1 |
| 5,854,779 A | 12/1998 | Johnson et al. | 369/59 |
| 5,857,020 A * | 1/1999 | Peterson, Jr. | 705/52 |
| 5,860,068 A | 1/1999 | Cook | 705/26 |
| 5,870,717 A | 2/1999 | Wiecha | 705/26 |
| 5,874,985 A | 2/1999 | Matthews, III | 348/7 |
| 5,889,868 A | 3/1999 | Moskowitz et al. | 380/51 |
| 5,890,136 A | 3/1999 | Kipp | 705/22 |
| 5,897,622 A | 4/1999 | Blinn et al. | 705/26 |
| 5,898,384 A | 4/1999 | Alt et al. | 340/825.36 |
| 5,899,980 A | 5/1999 | Wilf et al. | 705/26 |
| 5,903,878 A | 5/1999 | Talati | 705/26 |
| 5,905,800 A | 5/1999 | Moskowitz et al. | 380/28 |
| 5,909,492 A | 6/1999 | Payne et al. | 380/24 |
| 5,915,018 A | 6/1999 | Aucsmith | |

| | | | |
|---|---|---|---|
| 5,915,027 A | 6/1999 | Cox et al. ................... 380/54 |
| 5,915,068 A | 6/1999 | Levine ......................... 386/83 |
| 5,918,213 A | 6/1999 | Bernard et al. ............. 705/26 |
| 5,930,369 A | 7/1999 | Cox et al. ................... 380/54 |
| 5,933,798 A | 8/1999 | Linnartz ..................... 702/191 |
| 5,934,795 A | 8/1999 | Rykowski et al. .......... 362/309 |
| 5,940,135 A | 8/1999 | Petrovic et al. ............. 348/473 |
| 5,940,807 A | 8/1999 | Purcell ......................... 705/26 |
| 5,943,670 A | 8/1999 | Prager ........................... 707/5 |
| 5,946,665 A | 8/1999 | Suzuki et al. ................ 705/26 |
| 5,949,885 A | 9/1999 | Leighton ..................... 380/54 |
| 5,956,716 A * | 9/1999 | Kenner et al. ............... 707/10 |
| 5,959,945 A | 9/1999 | Kleiman et al. ............. 369/30 |
| 5,960,081 A | 9/1999 | Vynne et al. ................ 380/10 |
| 5,960,411 A | 9/1999 | Hartman et al. ............. 705/26 |
| 5,963,264 A | 10/1999 | Jackson ....................... 348/460 |
| 5,963,915 A | 10/1999 | Kirsch ......................... 705/26 |
| 5,963,917 A | 10/1999 | Ogram ......................... 705/26 |
| 5,966,440 A | 10/1999 | Hair ............................. 380/4 |
| 5,966,697 A | 10/1999 | Fergerson et al. ........... 705/26 |
| 5,969,283 A | 10/1999 | Looney et al. ............... 84/609 |
| 5,969,715 A | 10/1999 | Dougherty et al. .......... 345/327 |
| 5,970,471 A | 10/1999 | Hill ............................... 705/26 |
| 5,970,472 A | 10/1999 | Allsop et al. ................ 705/26 |
| 5,970,473 A | 10/1999 | Gerszberg et al. ........... 705/26 |
| 5,970,474 A | 10/1999 | LeRoy et al. ................ 705/27 |
| 5,970,475 A | 10/1999 | Barnes et al. ................ 705/27 |
| 5,974,396 A | 10/1999 | Anderson et al. ........... 705/10 |
| 5,978,775 A | 11/1999 | Chen ............................ 705/26 |
| 5,983,199 A | 11/1999 | Kaneko ........................ 705/26 |
| 5,983,200 A | 11/1999 | Slotznick ..................... 705/26 |
| 5,983,201 A | 11/1999 | Fay .............................. 705/27 |
| 5,988,078 A | 11/1999 | Levine ......................... 110/8 |
| 5,992,888 A | 11/1999 | North et al. .................. 283/56 |
| 6,002,772 A | 12/1999 | Saito ............................ 380/49 |
| 6,006,332 A * | 12/1999 | Rabne et al. ................. 713/201 |
| 6,013,007 A | 1/2000 | Root et al. ................... 482/8 |
| 6,014,491 A | 1/2000 | Hair ............................. 386/31 |
| 6,025,868 A | 2/2000 | Russo ........................... 348/3 |
| 6,029,141 A | 2/2000 | Bezos et al. |
| 6,032,130 A * | 2/2000 | Alloul et al. ................. 705/27 |
| 6,052,554 A | 4/2000 | Hendricks et al. ........... 455/5.1 |
| 6,064,980 A * | 5/2000 | Jacobi et al. ................. 705/26 |
| 6,067,107 A | 5/2000 | Travaille et al. ............. 348/1 |
| 6,067,532 A | 5/2000 | Gebb ............................ 705/37 |
| 6,073,372 A | 6/2000 | Davis ........................... 40/124.16 |
| 6,081,785 A | 6/2000 | Oshima et al. |
| 6,088,722 A * | 7/2000 | Herz et al. ................... 709/217 |
| 6,091,883 A | 7/2000 | Artigalas et al. ............ 386/83 |
| 6,115,348 A | 9/2000 | Guerra ......................... 369/112 |
| 6,119,096 A | 9/2000 | Mann et al. |
| 6,148,142 A | 11/2000 | Anderson .................... 386/125 |
| 6,148,428 A | 11/2000 | Welch et al. ................ 714/752 |
| 6,150,964 A | 11/2000 | McLaughlin ................. 341/59 |
| 6,151,600 A * | 11/2000 | Dedrick ....................... 707/10 |
| 6,175,840 B1 * | 1/2001 | Chen et al. .................. 715/501.1 |
| 6,177,931 B1 | 1/2001 | Alexander et al. ........... 845/327 |
| 6,233,389 B1 | 5/2001 | Barton et al. ................ 386/46 |
| 6,233,682 B1 * | 5/2001 | Fritsch ......................... 713/168 |
| 6,240,401 B1 | 5/2001 | Oren et al. ................... 705/40 |
| 6,269,394 B1 * | 7/2001 | Kenner et al. ............... 709/217 |
| 6,385,596 B1 * | 5/2002 | Wiser et al. .................. 705/51 |
| 6,424,998 B2 | 7/2002 | Hunter |
| 6,430,603 B2 | 8/2002 | Hunter |
| 6,430,605 B2 | 8/2002 | Hunter |
| 6,438,579 B1 * | 8/2002 | Hosken ........................ 709/203 |
| 6,463,467 B1 * | 10/2002 | Mages et al. ................ 709/218 |
| 6,496,822 B2 * | 12/2002 | Rosenfelt et al. ............ 707/9 |
| 6,522,769 B1 | 2/2003 | Rhoads et al. ............... 382/100 |
| 2001/0002852 A1 | 6/2001 | Kwoh .......................... 348/465 |
| 2001/0003846 A1 | 6/2001 | Rowe et al. .................. 725/47 |
| 2001/0005906 A1 | 6/2001 | Humpleman ................. 725/82 |
| 2001/0010045 A1 | 7/2001 | Stefik et al. .................. 705/51 |
| 2001/0010095 A1 | 7/2001 | Ellis et al. .................... 725/44 |
| 2001/0013037 A1 | 8/2001 | Matsumoto ................... 707/5 |
| 2001/0013120 A1 | 8/2001 | Tsukamoto ................... 725/5 |
| 2001/0014882 A1 | 8/2001 | Stefik et al. .................. 705/51 |
| 2001/0016836 A1 | 8/2001 | Boccon-Gibod et al. ..... 705/51 |
| 2001/0017920 A1 | 8/2001 | Son et al. ..................... 380/212 |
| 2001/0018742 A1 | 8/2001 | Hirai ............................ 713/193 |
| 2001/0018858 A1 | 9/2001 | Dwek ........................... 84/609 |
| 2001/0023416 A1 | 9/2001 | Hosokawa .................... 705/51 |
| 2001/0023417 A1 | 9/2001 | Stefik et al. .................. 705/57 |
| 2001/0023428 A1 | 9/2001 | Miyazaki et al. ............ 709/201 |
| 2001/0024425 A1 | 9/2001 | Tsunoda et al. .............. 370/82 |
| 2001/0024566 A1 | 9/2001 | Mankovitz ................... 386/83 |
| 2001/0025259 A1 | 9/2001 | Rouchon ...................... 705/26 |
| 2001/0025269 A1 | 9/2001 | Otsuka .......................... 705/52 |
| 2001/0025316 A1 | 9/2001 | Oh ................................ 709/231 |
| 2001/0027561 A1 | 10/2001 | White et al. .................. 725/1 |
| 2001/0027563 A1 | 10/2001 | White et al. .................. 725/46 |
| 2001/0029491 A1 | 10/2001 | Yoneta et al. ................ 705/53 |
| 2001/0029538 A1 | 10/2001 | Blockton et al. ............. 709/226 |
| 2001/0029583 A1 | 10/2001 | Palatov et al. ............... 713/193 |
| 2001/0030660 A1 | 10/2001 | Zainoulline .................. 345/720 |
| 2001/0031066 A1 | 10/2001 | Meyer et al. ................. 382/100 |
| 2001/0032131 A1 | 10/2001 | Mowry ........................ 705/14 |
| 2001/0032132 A1 | 10/2001 | Moran .......................... 705/14 |
| 2001/0032133 A1 | 10/2001 | Moran .......................... 705/14 |
| 2001/0032187 A1 | 10/2001 | Nuttall ......................... 705/57 |
| 2001/0032312 A1 | 10/2001 | Runje et al. .................. 713/172 |
| 2001/0034635 A1 | 10/2001 | Winters ........................ 705/10 |
| 2001/0034714 A1 | 10/2001 | Terao et al. .................. 705/57 |
| 2001/0034883 A1 | 10/2001 | Zigmond ...................... 725/109 |
| 2002/0057799 A1 | 5/2002 | Kohno |
| 2002/0062261 A1 | 5/2002 | Mukai |
| 2002/0066025 A1 | 5/2002 | Sato |
| 2002/0073038 A1 | 6/2002 | Oshima et al. |

FOREIGN PATENT DOCUMENTS

| | | | | |
|---|---|---|---|---|
| EP | 0 977 389 A2 | 2/2000 | ............ H04H/9/00 |
| EP | 0 984 631 A1 | 3/2000 | .......... H04N/7/173 |
| EP | 0 994 470 A2 | 4/2000 | ............ G11B/7/24 |
| EP | 1 104 195 A2 | 5/2001 | ............ H04N/7/24 |
| EP | 1 143 721 A1 | 10/2001 | .......... H04N/5/782 |
| JP | 2002 015333 A | 1/2002 | ............ G06T/13/00 |
| JP | 2002 099283 A | 4/2002 | .......... G10K/15/02 |
| JP | 2002 156979 A | 5/2002 | .......... G10K/15/02 |
| WO | WO 91/03112 | 3/1991 | ............ H04H/1/00 |
| WO | WO 94/13107 A | 6/1994 | ............ H04N/7/16 |
| WO | WO 96/26605 | 8/1996 | ............ H04N/7/00 |
| WO | WO 96/34467 | 10/1996 | ............ H04H/1/00 |
| WO | WO 96/34494 | 10/1996 | .......... H04N/7/173 |
| WO | WO 99/18727 | 4/1999 | ............ H04N/7/01 |
| WO | WO 00/05886 A | 2/2000 | ............ H04N/7/16 |
| WO | WO 00/07368 | 2/2000 | ............ H04N/5/775 |
| WO | WO 01/01677 A | 1/2001 | .......... H04N/5/445 |
| WO | WO 01/41013 | 6/2001 | ............ G06F/17/60 |
| WO | WO 01/47249 | 6/2001 | ............ H04N/5/00 |
| WO | WO 01/74050 A | 10/2001 | |

OTHER PUBLICATIONS

"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.

"Wink Communications, Inc., Changes the Advertising Landscape," http://www.wink.com/contents/PressReleases/930709807/content.shtml, downloaded and printed on May 14, 2002, dated Jan. 21, 1999.

"Wink's History," http://www.wink.com/contents/history.shtml, downloaded and printed on May 14, 2002.

"How Wink Works," http://www.wink.com/contents/howitworks.shtml, downloaded and printed on May 14, 2002.

"What is Wink: Examples," http://www.wink.com/contents/examples.shtml, downloaded and printed on May 14, 2002.

"The Wink System," http://www.wink.com/contents/tech_diagram.shtml, downloaded and printed on May 14, 2002.

"Wink Response Server and Wink Response Network," http://www.wink.com/contents/tech_wrs.shtml, downloaded and printed on May 14, 2002.

"ICAP and HTML (ATVEF)," http://www.wink.com/contents/tech_icap.shtml, downloaded and printed on May 14, 2002.

"Wink Studio and Wink Server Studio," http://www.wink.com/contents/tech_studio.shtml, downloaded and printed on May 14, 2002.

"Wink Broadcast Server," http://www.wink.com/contents/tech_wbs.shtml, downloaded and printed on May 14, 2002.

"Wink Client Software," http://www.wink.com/contents/tech_engine.shtml, downloaded and printed on May 14, 2002.

"Dataplay, Inc.—Universal Recording Media—Discover," http://www/dataplay.com/jsp_files/en/discover/index-music.jsp, downloaded and printed on May 14, 2002, (Copyright 2001).

"DataPlay, Inc.—Universal Recording Media—What's Playing on DataPlay," http://www/dataplay.com/servlets/ProductList?action=productSearch, downloaded and printed on May 14, 2002, (Copyright 2001).

"DataPlay, Inc.—Universal Recording Media—What's Playing on DataPlay," http://www/dataplay.com/jsp_files/en/whatsplaying/products.jsp, downloaded and printed on May 14, 2002, (Copyright 2001).

"DataPlay, Inc.—Universal Recording Media—What's Playing on DataPlay," http://www.dataplay.com/jsp_files/en/whatplaying/products.jsp?action=details, downloaded and printed on May 14, 2002, (Copyright 2001).

"DataPlay, Inc.—Universal Recording Media—Industry," http://www.dataplay.com/jsp_files/en/industry/products-digitalmedia.jsp, downloaded and printed on May 14, 2002, (Copyright 2001).

"DataPlay, Inc.—Universal Recording Media—Industry," http://www.dataplay.com/jsp_files/en/industry/products-engines.jsp, downloaded and printed on May 14, 2002, (Copyright 2001).

"DataPlay, Inc.—Universal Recording Media—Industry," http://www.dataplay.com/jsp_files/en/industry.contentproviders.jsp, downloaded and printed on May 14, 2002, (Copyright 2001)..

"DataPlay, Inc.—Universal Recording Media—Industry," http://www.dataplay.com/jsp_files/en/industry/products-contentkey.jsp, downloaded and printed on May 14, 2002, (Copyright 2001).

"DataPlay, Inc.—Universal Recording Media—Industry," http://www.dataplay.com/jsp_files/en/industry/index.jsp, downloaded and printed on May 14, 2002, (Copyright 2001).

"What's Playing on DataPlay—Everything Digital," DataPlay Micro-optical Engine Product Brochure, downloaded and printed on May 14, 2002, (Copyright 2000–2002).

"What's Playing on DataPlay—Everything Digital," DataPlay Digital Media Product Brochure, downloaded and printed on May 14, 2002, (Copyright 2000–2001).

"Onsale Invoice," http://www.onsale.com/cgi-win/invoice.exe, dated Jan. 19, 1998, printed Jan. 20, 1998, (Copyright 1997).

"Internet Archive Way Back Machine– Searched for http://www.egghead.com," printed Apr. 8, 2002, (Copyright 2001).

"Internet Archive Way Back Machine– Searched for http://www.onsale.com," printed Apr. 8, 2002, (Copyright 2001).

"Calimetrics' Multilevel Technology Enables Higher–Performance CD/DVD Recorders: An IDC White Paper," Wolfgang Schlichting, (Copyright 2000).

"Making Digital Cinema Actually Happen– What it Takes and Who's Going to Do It," Steven A Morley, (Copyright 1998).

"Streaming Onto the Movie Screen, with Nary a Scratch," Karen J. Bannan, The New York Times, May 9, 2002, p. E5.

U.S. patent application Ser. No. 09/385,671, Charles Eric Hunter, (filed Aug. 27, 1999).

U.S. patent application Ser. No. 09/436,281, Charles Eric Hunter, (filed Nov. 8, 1999).

U.S. patent application Ser. No. 09/476,078, Charles Eric Hunter, (filed Dec. 30, 1999).

U.S. patent application Ser. No. 09/487,978, Charles Eric Hunter et al., (filed Jan. 20, 2000).

U.S. patent application Ser. No. 09/493,854, Charles Eric Hunter et al., (filed Jan. 28, 2000).

U.S. patent application Ser. No. 09/502,069, Charles Eric Hunter et al., (filed Feb. 10, 2000).

U.S. patent application Ser. No. 09/553,524, Charles Eric Hunter et al., (filed Apr. 20, 2000).

U.S. patent application Ser. No. 09/645,087, Charles Eric Hunter et al., (filed Aug. 24, 2000).

U.S. patent application Ser. No. 09/675,025, Charles Eric Hunter et al., (filed Sep. 28, 2000).

U.S. patent application Ser. No. 09/684,442, Charles Eric Hunter et al., (filed Oct. 6, 2000).

U.S. patent application Ser. No. 09/707,273, Charles Eric Hunter et al., (filed Nov. 6, 2000).

U.S. patent application Ser. No. 09/737,826, Charles Eric Hunter et al., (filed Dec. 15, 2000).

* cited by examiner

| Step | Mode Name | Description | Hardware Involved |
|---|---|---|---|
| 1 | Selection | Customer looks at recently updated "catalog" of available music selections on his TV using the graphical user interface. Use remote to page through information. | User station, remote, customer TV, stored catalog |
| 2 | Ordering | Customer uses user station, remote and TV screen to order standard or customized CD. Order communicated to central controller by Internet or modem. Central controller issues decoding and encryption key(s), selection locations and order number to user station for preview. | User station, modem/Internet, remote, customer TV |
| 3 | Downloading | Music selections are downloaded during early morning transmission hours as encrypted, compressed files through customer's satellite dish and receiver to hard disk in user station. User station selects correct TV channel on receiver using IR link. | User station, satellite receiver, video output interface |
| 4 | Decoding | User station uses decoding key(s) to decode downloaded file(s) so that full quality music is on disk drive (or other storage medium) in user station. Customer order number is hidden within this music based upon encryption information received during ordering process. | User station |
| 5 | Previewing | Brief portions of downloaded selections may be "previewed" by the customer along with the entire selection that has been "hobbled" by removing information to degrade music quality and prevent reconstruction of music. | User station, remote, customer's amp, speakers and TV |
| 6 | Playing | Customer plays full-quality selection through his hi-fi or TV sound system with post billing back his account via later modem/Internet communication with the central controller. Playing may include graphics, written jacket information, or hearing impaired cues shown on customer's TV. | User station, remote, customer's amp, speakers and TV |
| 7 | CD Delivery | Full-quality CD that can be heard on any CD player is burned with order number (ID tag) hidden in the music. (Burning process does not need to be quick.) | User station, CD burner, customer supplied CD |
| | Account Setup | Happens when customer buys and hooks up the user station. | |

FIG. 2

|  | Customers w/o CD Burner | Customers with CD Burner |
|---|---|---|
| Steaming during the day (Top releases from download catalog) |  | ✓ |
| Batch stream at night (All ordered releases from download catalog) |  | ✓ |
| Profile based stream at night (Releases from full library "Quick-ship" catalog) |  | ✓ |
| Promotion based Stream (Promotional music pushed by Record Label) |  | ✓ |
| Quick-ship overnight (Full library catalog) | ✓ | ✓ |

FIG. 15

MUSIC DISTRIBUTION SYSTEMS

FIELD OF THE INVENTION

The invention relates to music distribution. In certain embodiments, music is blanket transmitted (for example, via satellite downlink transmission) to each customer's computer-based user station. Customers preselect from a list of available music in advance using an interactive screen selector, and pay only for music that they choose to record for unlimited playback. An antipiracy "ID tag" is woven into the recorded music so that any illegal copies therefrom may be traced to the purchase transaction.

DESCRIPTION OF THE PRIOR ART

Current music distribution systems have numerous drawbacks that affect pricing, consumer satisfaction and the ability of music content providers to maximize the revenue potential of their music libraries. One distribution model, the conventional retail music store, requires high capital outlays for real estate (land and building) and high labor costs, both of which add greatly to the retail price of music recordings. Additionally, costs associated with ordering the recordings (e.g., CD's), transporting the recordings to the store locations and maintaining inventory significantly add to the retail price of recordings for both retail store operations and mail order or "music club" operations. In addition to the drawbacks mentioned above, music content providers would greatly benefit from a distribution system that makes all of their content, including older recordings, readily available at market clearing pricing.

The recent Internet music distribution model, typically based on MP3 technology, requires a customer go to an Internet site, select or be given a music selection, download reception software and a key, preview or purchase a selection, download a one-to-one encrypted (or not) compressed copy of the selection, decrypt the selection with software and play the selection on the consumer's computer or write it to a CD, DVD, MD or digital player. The download is stored in some form on the customer's hard drive.

There is an acute need in the music distribution industry for a system that will overcome problems inherent in current distribution models by providing each individual customer with ready access to thousands of recordings in a convenient low cost manner that fully satisfies user demand, while enhancing the economic incentives of music content providers to create and distribute an ever expanding offering of music.

Throughout the world today, piracy of software, music and video materials causes significant economic losses to the originators and distributors of these art forms.

Issues of music and video piracy are strongly influenced by the available recording technology. Early forms of music distribution utilized plastic records. The manufacture of records was relatively expensive, requiring the capital expense of record presses and creating metallic master molds. Mold costs had to be amortized over large numbers of copies. The cost of mold masters limited the potential profit from making and selling illegal copies.

With the development of magnetic tape recording, the cost of manufacturing copies became primarily the cost of the raw materials. Copies could be made directly from an original with costs split between the manufacture of a blank tape and the time required to record music on to each tape copy. The manufacture of lower numbers of copies for specialty music was possible and the costs of manufacturing (a pair of tape recorders and some blank tapes) made copying feasible for an individual. However, the degradation in quality from generation to generation of copies was a deterrent as well as the time required to record each copy. The degradation of the sound consisted of loss of high frequencies, a relatively poor signal-to-noise ratio of the recording ("hiss") and tonal or volume variations due to mechanical transport of the tape across the recording head ("wow" and "flutter").

Digital compact disk technology (CD's) again changed the piracy situation by making available high-quality copies of music to consumers in digital form that could potentially be copied with no change or degradation of sound quality. CD's use 16-bit, 44 KHz digital technology so that music recorded on a CD has excellent signal-to-noise ratio, flat frequency response that is wider than human hearing, and no constant or varying pitch distortion. The introduction of CD technology caused significant concern among content providers about the risks of circulating library-quality copies of their music. Small-scale piracy of CD's became common as consumer music "boxes" were sold that had CD players feeding tape recorders. These units allowed CD's to be easily copied although without the full sound quality and convenience of the original CD. On a larger scale, bulk pirate copies of CD's were available, particularly in foreign countries, by companies using relatively expensive CD presses. The presses allowed exact copies of CD's to be made from originals using inexpensive blanks. These same presses also allowed low-cost copying and duplication of software CD's.

Very recently, concerns about music piracy have increased as low-cost CD writers became available to consumers making it possible for personal computers not only to read and play music CD's, but also to make copies using relatively inexpensive writeable CD's. Today CD writers are available for under $200 and CD blanks for less than $1 each. Coupled with multi giga-byte hard disks, copying and editing CD's is widely available.

Today, the threat of copyright violation limits CD piracy. However, due to the cost of prosecution and the difficulty of tracing and confirming the origin of copies, this threat is only practically enforceable against major producers who are caught importing large quantities of CD's, and not individuals or small-scale pirates (e.g., teenagers with computers). As the price of CD burners and writeable CD's continues to fall, music piracy may result in increasing losses in revenue to content providers, especially if the teenage culture (that buys so many CD's) embraces piracy and kids get used to seeing CD's without boxes or colorful paintings on the CD's.

A second technological revolution is also influencing piracy. This is the ability to "compress" the amount of digital data needed to store or communicate music (or video). A one-hour music CD requires about 600 megabytes of data (16 bits/sample*44100 samples/sec*3600 sec*2 channels). This large amount of data has discouraged communication of CD's over the Internet, and storage of the CD in hard drives. However, MPEG compression technology reduces the data capacity by a factor of 8 for CD music, making it easier and cheaper to communicate and store. As a result of compression technology it is now economically feasible to communicate music with CD quality over the Internet or to transmit it directly to consumer receivers from satellites. (Similar technology allows a 100-fold compression of video signals making direct-satellite TV and DVD recordings possible.) Furthermore, businesses that sell CD's by shipping them as compressed data streams to a customer's PC with a CD writer to make a final copy will make it common for CD's not to have the elaborate paint jobs of store-sold CD's and the potential to cause a sudden rise in piracy. It also should also be noted that compression depends upon and has caused powerful digital processing engines to be placed at reception sites for compressed audio or video. These engines make possible the running of protected software (protected software is software that runs the engine but can not be analyzed by outsiders to see how it works or does the encoding or decoding) that can be used for de-encryption or be capable of performing the processing necessary to add the more complex ID tags that can be used as an aspect of this invention.

Content providers are reluctant to make full-quality music available to consumers via direct satellite broadcasting or the Internet because of the risk that exact copies of their materials, their core asset, will leave their control and freely circulate among consumers resulting in huge losses in revenue to distributors and artists. This financial threat could weaken the recording and entertainment industry in the United States.

Another set of issues concerns the evolution of targeted advertising. Targeting is the presentation of material to pre-selected groups. For example, a new record thought to appeal to teenagers would be described by advertising in magazines teenagers read, TV shows they may watch or on radio stations they are likely to listen to. Because of the wide range of music types and preferences, targeted advertising is key to affordable, efficient advertising in the music industry.

Similarly, the trend for CD stores to allow potential customers to sample music releases is a method of allowing very specific sampling of possible choices of targeted advertising recognizing that customers rarely purchase without prior knowledge of the group, recommendations, advertisement, or hearing part of the music.

SUMMARY OF THE INVENTION

The present invention provides music distribution systems that are beneficial to all involved parties, namely consumers, content providers and data transmission providers. In certain embodiments, consumers are able to preselect music selections from thousands of CD's that are transmitted daily. Customers of the music distribution system utilize a menu driven, graphical user interface with simplified controls that provide music selection by artist, title and category (e.g., jazz, classical, rock, etc.). Music content is blanket transmitted, preferably via direct broadcast satellite (DBS), in an encoded format directly to each customer's receiving dish or antenna which is linked to the customer's user station. The user station may store the content on a suitable intermediate storage medium such as a disk drive. The customer may "preview" the stored music for free and thereafter decide whether to purchase a permanent copy. If the purchase decision is made, a full quality CD is recorded via a CD writer that may be part of the user station. The customer is billed by the music distribution system operator. Antipiracy protection is provided by weaving an ID tag into the recorded music so that any illegal copies therefrom may be traced to the purchase transaction. An automated production facility may be provided to manufacture low-volume CD's (i.e., CD's that are not frequently requested) and distribute them by ground transportation, while the higher volume CD's are distributed by satellite as described above.

Customer music preferences may be used to determine what content is stored in the limited space on their hard drive, and that content is immediately available, on demand, to the consumer. Customer preference information is thereby used to make use of limited broadcast bandwidth and system storage. This preference information is gleaned from information given by the user, and may be combined with demographic preference information collected from a population of customers.

The music distribution system of the present invention offers numerous advantages to consumers. For example, the invention provides a much greater selection of recordings than any typical retail music store or mail order operation. The invention also provides full access to the available recordings to those who live in geographically remote and/or sparsely populated areas that may presently have little or no access to retail music stores. The invention also provides full access to recordings to elderly and handicapped persons who are housebound. In addition to a larger selection and better access, the recordings (especially high demand recordings such as "top 25" CD's and new releases) are available on demand, subject only to the time period between placing an order and the next transmission of the ordered recording. Certain recordings, limited in number by the capacity of the intermediate storage medium (e.g., 80 CD's) are instantly available for purchase.

The present invention also provides the ability to update music pricing at any time, for example on a daily, weekly or monthly basis, so that consumers can choose to order music at times when content providers offer pricing specials or incentives.

Music content providers realize increased income increased income because a significant portion of the existing content in their music libraries is available for sale every day. The invention also allows music content providers to change pricing at any time, e.g., daily/weekly/monthly, to optimize price vs. consumer demand. In this regard, content providers are allowed to meet consumer demand for a significant portion of the existing content inventory value every day. This provides an extremely high benefit by effectively allowing the market to clear (i.e., real demand matches supply), something that the current music distribution models do not provide.

According to the invention, music content providers are confident that they can distribute their music with extremely high security by avoiding distribution of content over open networks and open operating systems and through the use of appropriate encoding technology, including encryption/decryption and the use of ID tags that permit illegal copies to be traced.

Transmission providers (DBS satellite system providers, in preferred embodiments) realize the advantage of a significantly increased income base for supporting their services and the utilization of lower cost, off-peak time for transmission of a significant portion of the music.

This system also allows targeted advertising of specific recordings to persons of specific preferences. This advertising may be text, graphics or video on the customer's screen or portions of music.

BRIEF DESCRIPTION OF THE DRAWINGS

Some of the features of the invention having been stated, other features will appear as the description proceeds, when taken in connection with the accompanying drawings, in which

FIG. 2 shows the operational sequence for use of the music distribution system of FIG. 1 by a customer.

FIG. 15 is a chart identifying various music distribution methods employed according to certain embodiments of the invention and the options available to customers with and without recording devices (e.g., CD burners).

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

1. The Overall Music Distribution System, Generally

Figure 1:
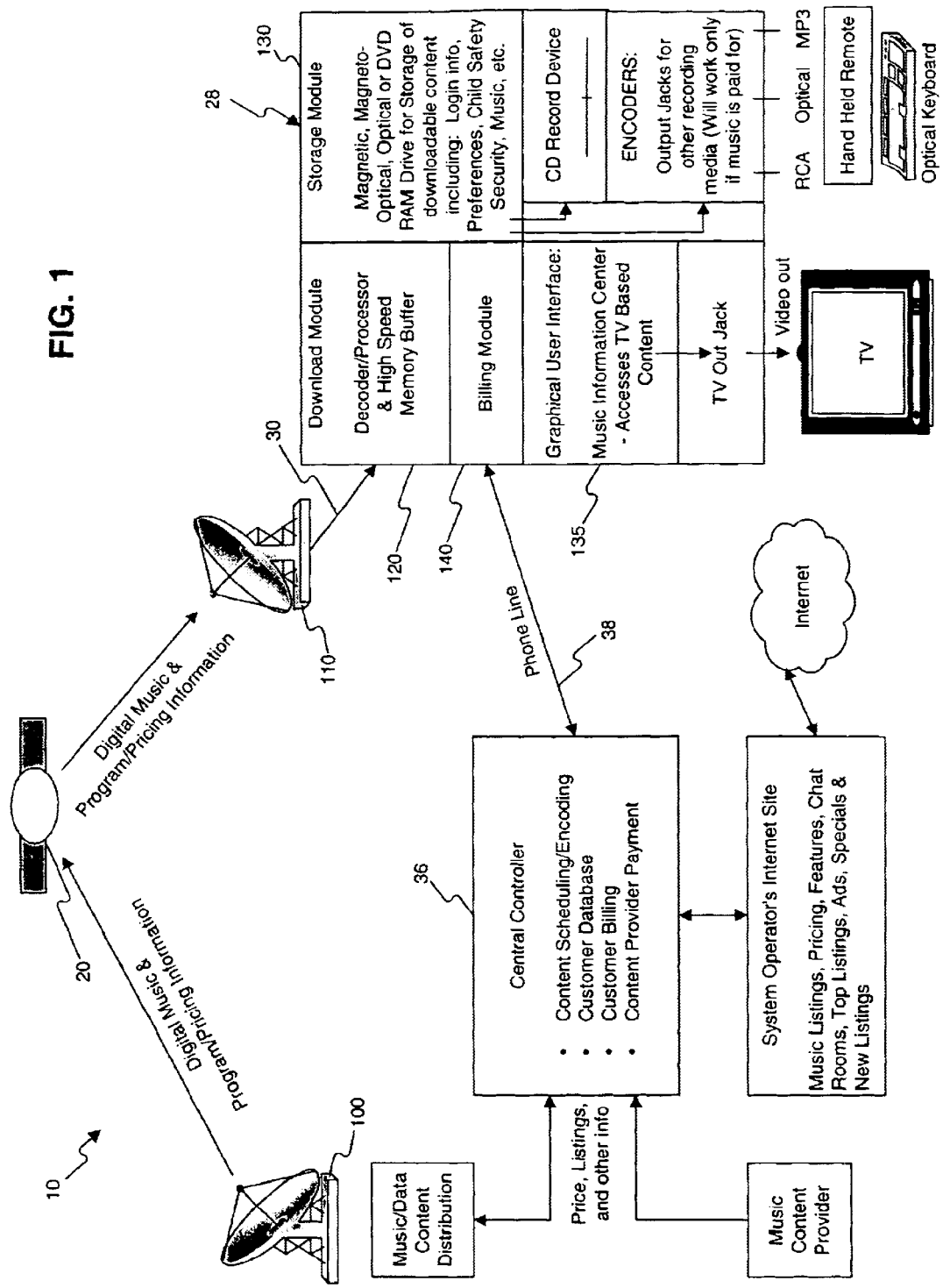
FIG. 1 is a schematic representation of a satellite-based music distribution system.

Referring to FIG. 1, there is shown a simple schematic of one embodiment of a music distribution system 10 of the invention. System 10 utilizes direct broadcast satellite (DBS) transmission via satellite 20 as the means for blanket transmitting encoded data, either in real time or in time compressed format (for example, at two to four seconds per song). The program data is received at each customer household by a receiving antenna or dish 110. Dish 110 is linked to a dedicated "box" or user station 28 by a satellite receiver link 30. User station 28 is an interactive device permitting customers to preselect desired music selections for recording through the user station. Station 28 communicates at appropriate times with a central controller system 36 via a phone/modem connection 38 (land, Internet or cellular). Central controller system 36 stores a discrete address (e.g., telephone number, credit card number or billing address) for each customer household and receives information via connection 38 to verify that a preselected music selection has been recorded. Central controller system 36 utilizes this information to bill customer households and also to credit the accounts of content providers. The satellite link (or alternatively the central controller system 36) periodically communicates with each customer household to provide information on available music and program/pricing information.

Further details of the distribution system are provided below and in commonly owned U.S. patent application Ser. Nos. 09/385,671; 09/436,281; 09/476,078 and 09/493,854, the teachings of which are incorporated herein by reference in their entirety.

2. The Satellite(s)

According to preferred embodiments of the present invention, data transmission is achieved utilizing geostationary satellites operating in the KU band that are downlinked to conventional receiving antennae or dishes located at the customer households.

Following the recent acquisition of PrimeStar's assets by Hughes, there are now two digital broadcast satellite providers in the United States, Hughes (DSS) and EchoStar (DISH Network). EchoStar's DISH network launched an additional satellite in September 1999 (its fifth satellite) that, in combination with its previous satellites, provides continuous transmission of greater than five hundred channels to substantially the entire continental United States. EchoStar now has satellites located in the 119, 110, 61.5 and 148 positions within the Clark Belt.

With the above satellite orientations, EchoStar's new "DISH 500" system utilizes an elliptical twenty inch antenna or dish containing two LMBS heads that can receive information from two different satellites simultaneously. As mentioned above, this system permits greater than five hundred channels to be directly broadcast to each customer household.

Currently preferred embodiments of the present invention utilize the EchoStar system, most preferably the DISH 500 system, for data transmission at either real time or time-compressed transmission rates, discussed below. In alternative embodiments, the invention may be implemented utilizing the Hughes (DSS) system, or a combination of both the Hughes and EchoStar systems (resulting in a relatively smaller portion of each system's total capacity being devoted to the invention's music distribution).

3. Data Transmission Parameters

EchoStar's DISH 500 system provides a very high band width of approximately 4 megabits/sec for each channel (23 megabits/sec per transponder), for a total transmission capacity of approximately 2000 megabits/sec for five hundred channels.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity allotted for forward error correction and system management inherent in lower power transponders. Also, along with the use of higher power transponders, the invention may be carried out with quanternary (QPSK) polarization to double the effective bit transfer rate for each transponder over that which may be obtained by using current orthogonal polarization—with a sacrifice in bit error rate that is acceptable for those applications of the invention where lower video and audio resolution is not an important consideration to the customer. Thus, the use of high power transponders (e.g., 240 watts or higher) in conjunction with higher level polarization (e.g., quanternary) permits music distribution systems of the invention to be implemented utilizing less of the DBS system's total transmission capacity, permits the transmission of a greater number of music selections or other content and permits greater time compression of the transmitted data, or a combination of the above, all to the benefit of consumers.

4. Details of the User Station and Operation

Referring again to FIG. 1, music content providers deliver music in digital form to the central controller 36 of the music distribution system. The content is encoded utilizing an encoding technology that is well known in the art, such as interlaced coding techniques in combination with a unique header code that identifies each title. In certain embodiments, only the unique header coding is employed to identify each specific title. It is also understood that the header code can also identify the exact transmission time of each title. The header code containing transmission times can be digitally communicated to the operating system of the user stations 28 to prevent unauthorized reception and subsequent duplication of digital music content. In addition, it is also understood that selection of a specific title by the user can require a completed payment before activation of initial reception and storage of the digital music content, or before the digital music content is recorded on any other device or media.

The encoded music content is scheduled and transmitted, to the direct broadcast satellite up-link facility 100 by the 'system operator through central controller 36. In addition, periodic digital program/pricing information is transmitted to the up-link facility, for example, every ten minutes. While it is understood that direct broadcast satellite transmission currently operates in the KU Band, other frequencies can also be employed to achieve similar results. It is understood that the music content can be transmitted at real or time compressed speeds. In preferred embodiments, music content is transmitted at faster than real time speeds, where real time speeds refer to the playback speed of the recorded music. For example, a single satellite transponder capable of 23 megabits/sec transmission can transmit a typical 4 minute song in less than 4 seconds, for example, in certain applications approximately 2 seconds per song utilizing high compression techniques. Thus, EchoStar's DBS programming capacity (discussed above) allows transmission of 400,000 to 500,000 song titles (approximately 30,000 to 40,000 CD's) during a four hour period (assuming 4 seconds per song), most preferably during a period of low viewership, e.g., 1:00 AM to 5:00 AM. Using a single transponder for blanket music transmission permits transmission of 500 to 600 CD's in a four hour period.

The digital music content and program/pricing information, once received by the appropriate satellite, are then transmitted down broadly (i.e., "blanket transmitted") to geographic coverage areas where the user stations can receive the downlink transmissions.

The music program and pricing information are received by the home user's satellite dish 110 and transmitted to download module 120 contained in the user station where it is decoded and stored digitally in storage module 130 also contained in the user station.

The customer preselects music content to be downloaded by selecting the content utilizing the graphical user interface 135 shown on the TV screen. The order is communicated to central controller 36 by Internet or modem. Pricing information for the preselected music content is then transmitted to the billing module 140 contained in the user station where it is stored in nonvolatile memory such as SRAM for subsequent querying via the phone line by central controller 36.

The music content preselected by the customer is blanket transmitted by satellite 20 at the scheduled time and is received by the home user's satellite dish 110. This music content is transmitted to download module 120 where it is decoded and stored digitally in storage module 130.

In certain embodiments, the user station 28 will also contain an audio speaker system (not shown) to allow the customer to "preview" the stored music before it is recorded permanently on a CD or other recordable medium and subsequently paid for. In this embodiment, the preselected pricing information stored in billing module 140 will not be transmitted for payment to the system operator until the customer has either listened to the music content a set number of times, for example, 3 times, or the customer indicates via the graphical user interface that he wishes to permanently record it. As an alternative, previewing may be accomplished by playing a highly compressed "preview" copy through the customer's speaker system or headphones. Highly compressed material lacks richness, signal to noise ratio, stereo channels and high-frequency bandwidth. Preview can be communicated in perhaps 1% to 10% of the final copy depending upon the compression schemes used. Each preview has a brief section (20 seconds) of the real sound of the selection to allow the customer to really sample the material as well as generate interest in paying for a "good copy". If desired, the preview material may be further hobbled with some simple distortion, added noise, limited low end, crackles and pops, voice overlay, missing sections, sliding notches, amplitude compression. Content providers may be given choice as to the nature of the hobbling beyond the heavy transmission compression.

When the customer decides to purchase the music, the graphical user interface prompts the customer to insert a recordable medium such as a writeable CD into the user station, or attach other recording device to the user station's output connectors. (In certain cases, the customer may choose to record preselected music content multiple times. In such cases the music content provider may offer pricing discounts for multiple recordings.) The user station records the preselected music content stored in the user station and then either deletes the music contained in storage module 130 once the recording has been completed or allows the customer to manually delete content no longer desired.

The customer accesses (or navigates) the graphical user interface via a hand held remote. In preferred embodiments, the remote control communicates via infrared LED transmitter to an infrared sensor contained on the user station. An optional keyboard can be utilized by the customer to access navigate) the graphical user interface via the same infrared sensor contained on the user station.

The above sequence of operation is summarized in FIG. 2, which is largely self explanatory. The illustrated modes of operation, following account setup, are identified as:
1. Selection
2. Ordering
3. Downloading
4. Decoding
5. Previewing
6. Playing
7. CD Delivery.

Figure 3:
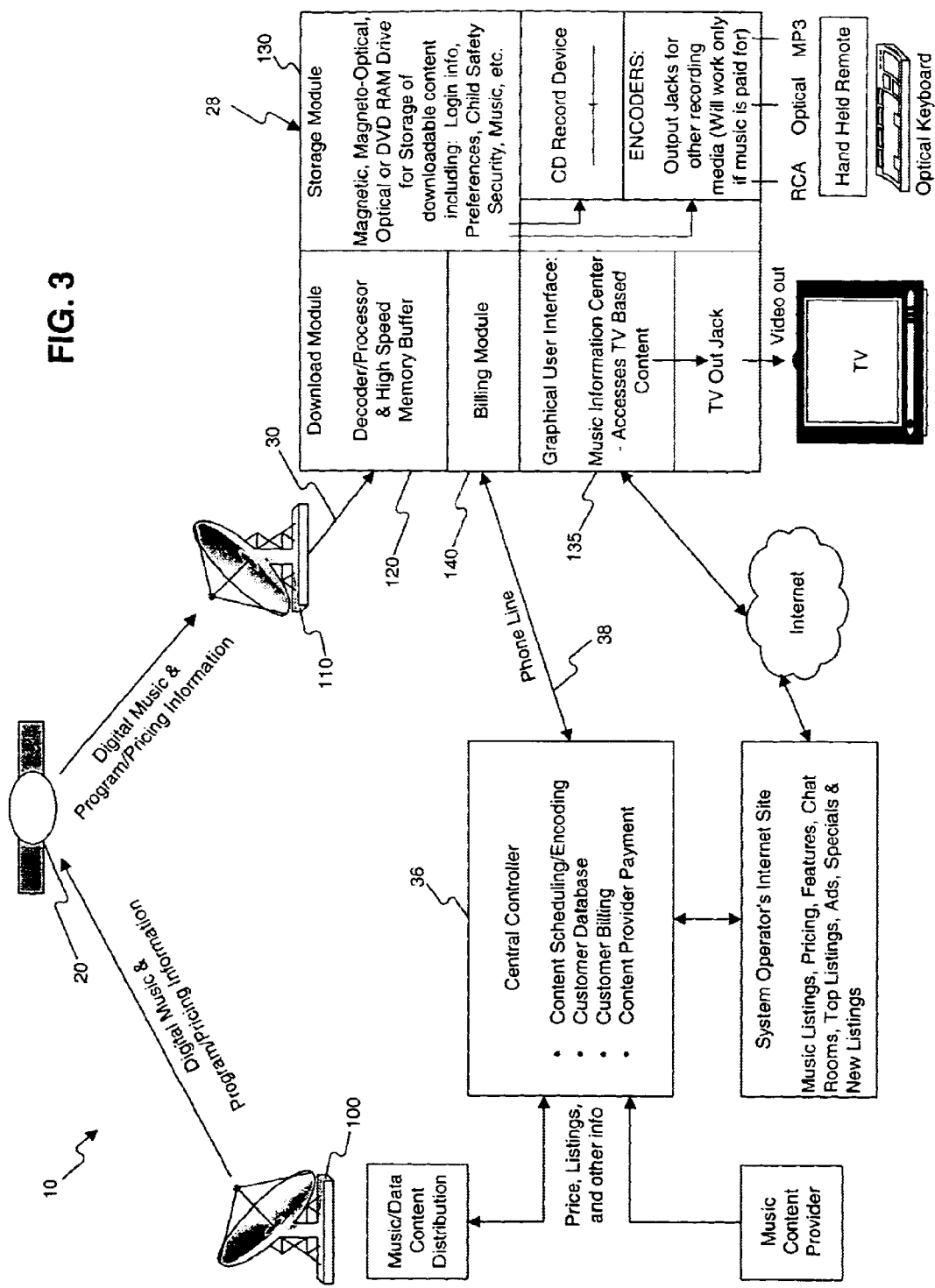
FIG. 3 shows another music distribution system wherein the user station includes an Internet browser and processor enabling customers to access the system operator's music Internet site via phone line or Internet connection.

FIG. 3 illustrates another embodiment wherein the user station contains an Internet browser and processor that enables the customer to access the system operator's music Internet site via phone line or other Internet connection.

Figure 4:
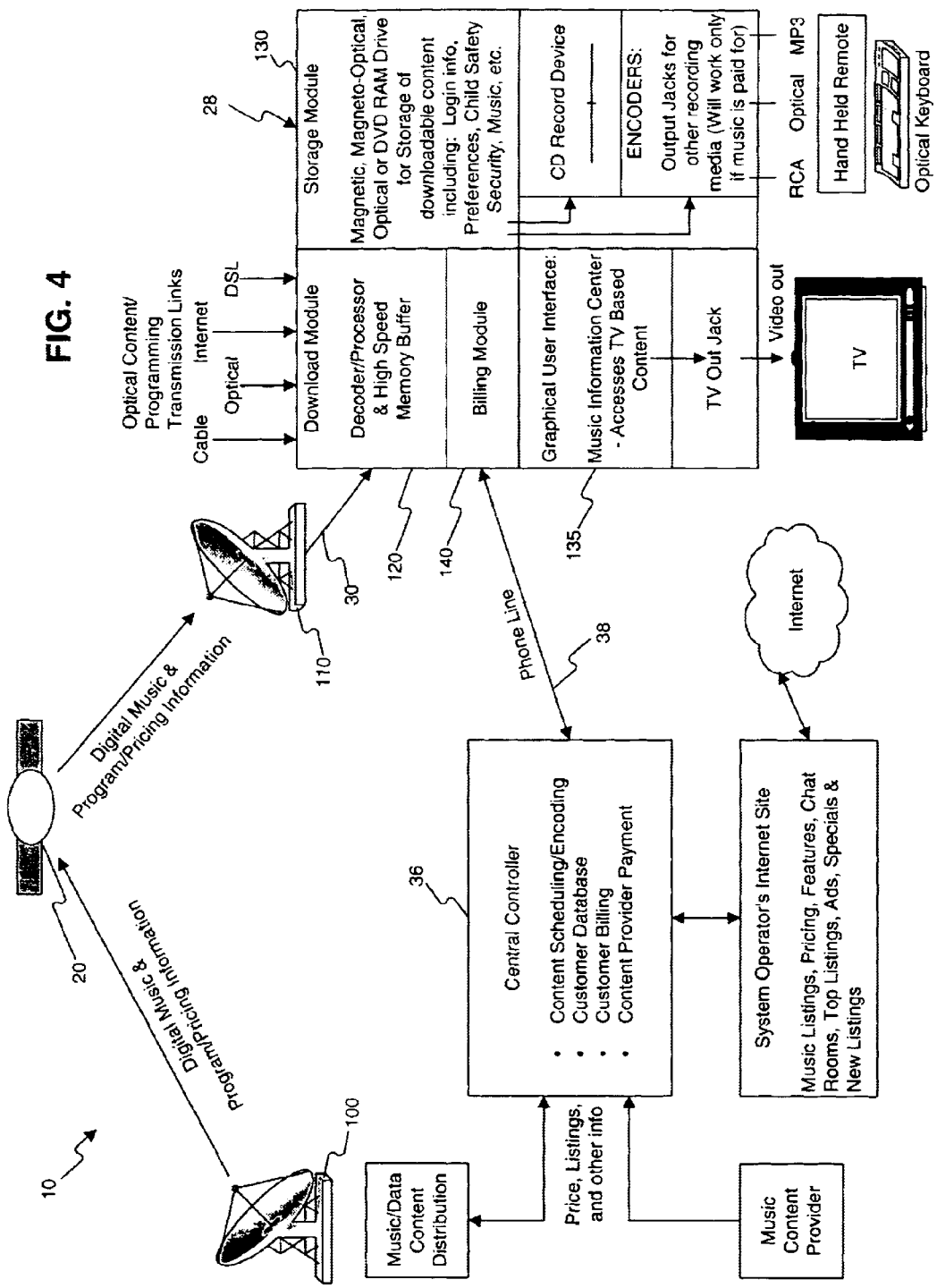
FIG. 4 shows yet another music distribution system depicting optional content/programming transmission links.

Optional digital content/programming transmission links (i.e., optional means for blanket transmitting music and other data) are shown in FIG. 4. These include, but are not limited to, cable, optical fiber, DSL and the Internet.

5. Alternative Technologies for Scheduling Transmission of Music

Figure 6:
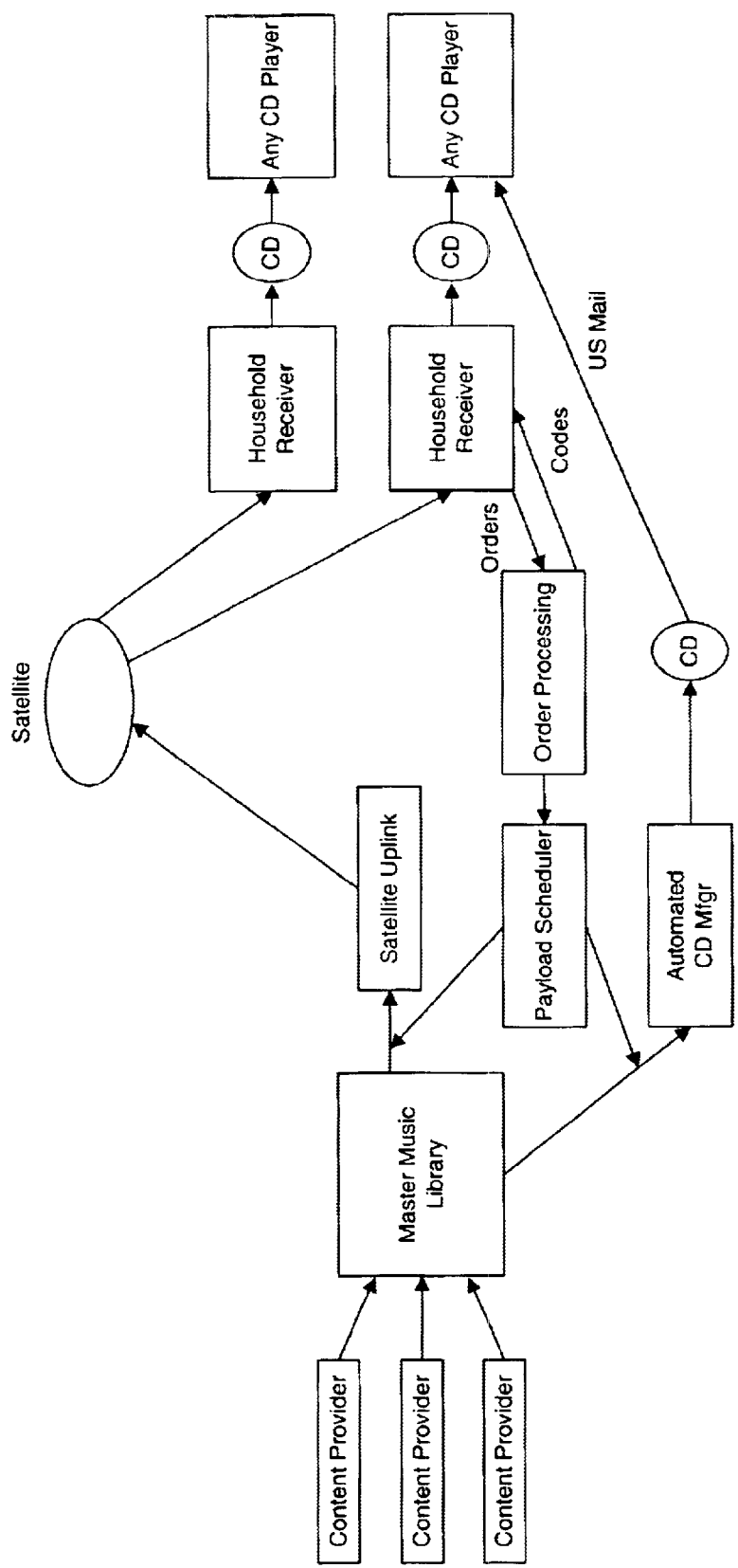
FIG. 6 is a block diagram of portions of a music distribution system showing an automated CD manufacturing operation used to supplement satellite distribution, and also showing a "payload scheduler" used to actively manage the transmission schedule of music.

Certain embodiments of the invention divide music into "tiers" of transmission frequency. For example, the music may be divided into three tiers, with Tier 1 music (the most popular) being transmitted every 30 minutes, Tier 2 music every four hours and Tier 3 music (the least requested) being sent late night. This assignment of music to appropriate tiers occurs on a daily or weekly basis. Other embodiments simply transmit all music once a day, for example during late night, off-peak hours. However, due to bandwidth limits and the significant costs of existing satellite transmission systems, it may be desirable to actively manage the transmission schedules of music to maximize consumer satisfaction (see FIG. 6).

Active scheduling of music on an hourly basis allows maximizing consumer satisfaction by monitoring music requests from all or a subset of satellite receivers and appropriately scheduling transmissions of the music. This might mean having a fixed schedule for 90% of the next few hours of transmissions, but allocating the last 10% of bandwidth (or purchasing extra bandwidth) to send music that happens to be more popular that day. More popular music might happen due to quickly changing popularity demographics perhaps due to a news story, Internet review or cultural happenstance. The effect may be to move a selection to the maximum rate of transmission (e.g., every 15 minutes) or move a Tier 3 selection from an overnight transmission to an hourly transmission. Similarly, a Tier 1 selection that is poorly requested might be replaced.

There are many possible schemes for assigning transmission slots varying from the "hottest 10%" scheme above to methods that assign slots based upon the estimated ordering demographics. For instance, if college students are determined to place a high value on quick delivery of their selection whereas the "older adult" market is as satisfied with one-hour or two-hour delivery, then requests coming from the college market may get priority assignment of transmissions. The demographics of the current ordering population might be estimated from the type of music being ordered or recognizing the request source, like a request from a "college town" is likely a college request.

The mechanisms to handle active scheduling rely on knowing what selections are currently being requested. Current satellite receivers operated by EchoStar and Hughes communicate by modem with central computers on varying schedules. In some systems, modem connections are infrequent and credit is extended to the customer so that a receiver can order six or eight movies before requiring connection to the billing computers. In other systems, individual receivers might be contacted ("pinged") by the billing computers on a daily basis to check for usage. Active scheduling of music transmission times requires that all or part of the satellite receivers contact the central computer whenever an order is placed. This communication would occur over phone modem, cable modem or Internet and may be initiated without the customer's knowledge. Copies of order records in the central computer must be transferred to a computing system that schedules transmissions, and then schedules must be communicated to the system that feeds music (or video) to the satellite uplink transmitters. If desirable, transmission schedule information can be updated on the consumer interface as soon as schedules are revised, perhaps allowing a consumer to imagine that their order has prompted the system to send a selection more frequently. Schedules are only a fraction of a megabyte in size and may be sent very frequently without significantly impacting bandwidth.

Figure 7:
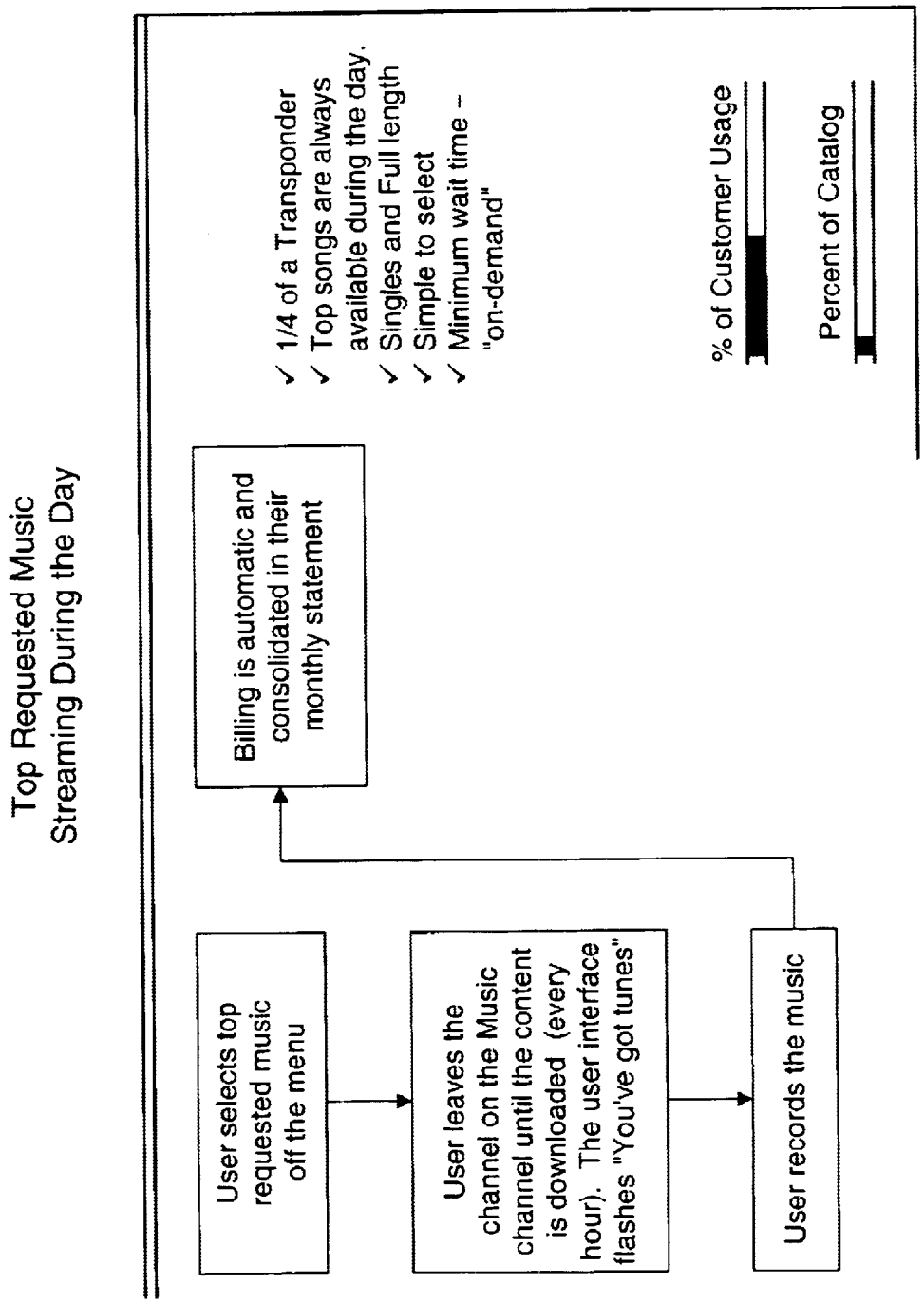
FIG. 7 is a flow sheet showing the manner of music distribution for streaming top hit songs during the day.
Figure 8:
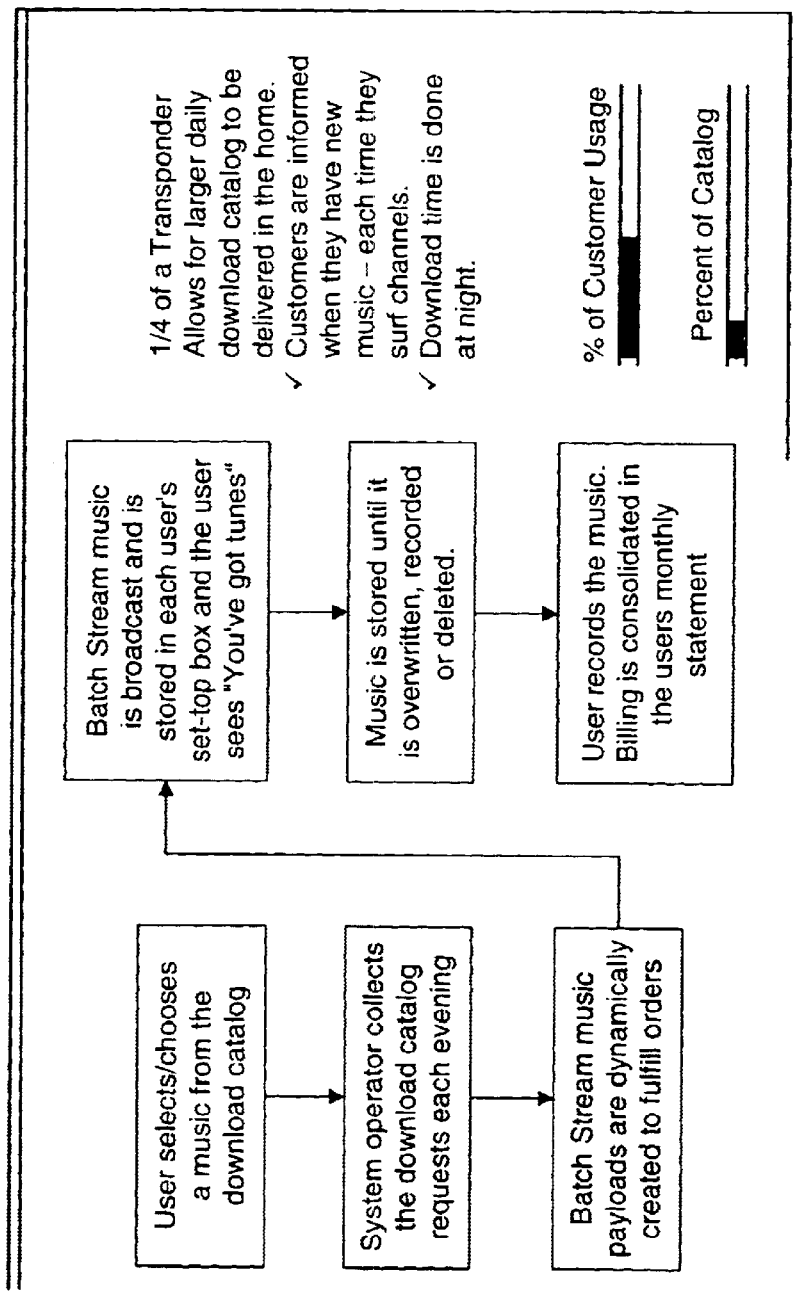
FIG. 8 is a flow sheet showing how orders for musical recordings placed during the previous day are batch streamed at night to fulfill customer orders.

One example of active scheduling of music will be described with reference to FIGS. 7 and 8. According to this example, the top requested music (e.g., new releases and other recordings that are currently most popular) are blanket broadcast ("streamed") every hour. As described above, a customer uses the graphical user interface to select one or more of these recordings for downloading. In certain embodiments, the customer leaves the channel of his DBS (or cable) receiver on the designated "music channel" until the requested recording is downloaded to intermediate storage in storage module 130. When the download is completed, the customer user interface flashes a cue such as "YOU'VE GOT TUNES", following which the customer may permanently record the music, with automatic billing that appears on the customer's consolidated monthly statement. This hourly transmission of top requested recordings may be achieved by utilizing one quarter of a DBS system transponder (or corresponding cable bandwidth) so that top songs are always available during the day with minimal wait for downloading. The recordings may be available as full CD length recordings or single songs. According to this example, a second blanket transmission of music occurs as a "batch stream" at night, for example, from 12:00 AM to 8:00 AM. Customers select music from the download catalog and the system operator collects these selections each evening and uses the information to batch stream the music payloads which may be dynamically created to fulfill the orders. The batch stream music is broadcast and stored in each customer's user station (set top box) and the customer sees a designation such as "YOU'VE GOT TUNES". As with any downloaded music according to this example, music is stored in intermediate storage (storage module 130) until it is overwritten, recorded or deleted. When the customer permanently records the music, billing is consolidated into the customer's monthly statement. The night time batch stream of music may also be achieved with an appropriate dedicated bandwidth, for example, one quarter of a DBS transponder. This technique allows for a larger daily download catalog to be provided in customers' homes. As mentioned, the customers are informed when they have new music, each time they "surf" channels on their DBS (or cable) system.

It will be appreciated that according to this example, the DBS (or cable) receiver is left on the designated music channel until the requested recording is downloaded. However, this scheme may be carried out with a receiver having a microprocessor permitting the receiver to play one channel for viewing on the television while simultaneously downloading customer requested recordings from the music channel. As will be appreciated by those skilled in the art, the capability of permitting simultaneous television viewing and music downloading via separate channels in the DBS (or cable) receiver is readily achievable by provision of a microprocessor having sufficient processing speed.

6. Use of Intermediate Storage Capability (Storage Module 130) of the User Station to Store Music that is Available "on Demand" for Permanent Recording As discussed above, storage module 130 of user station 28 includes an intermediate music storage medium (e.g., a hard drive) that stores each music recording that the customer selects for downloading until such time as the customer either makes (and pays for) a permanent copy of the recording (e.g., via a CD burner), the customer deletes the recording from memory, or the recording is written over when the storage medium's capacity is reached (e.g., on a "first in, first out" basis). When the user station is provided with a storage module 130 having a substantial data storage capacity, it is possible for many recordings to be immediately available to the customer for permanent recording. For example, a user station 28 in the form of a DBS (or cable) system "set top box" may have a disk drive with a storage capacity on the order of 17 Gigabytes, with 8 Gigabytes devoted to the intermediate music data storage function of storage module 130. This 8 Gigabyte storage medium permits the storage of approximately 80 compressed CD's at all times in each customer's user station. The customer, therefore, at all times has immediate on-demand access to the approximately 80 CD's in his storage module for permanent recording on his recorder (e.g., CD burner). Music on the hard drive can be stored in encrypted format to prevent loss.

Thus, one advantage of a large storage capacity at storage module 130 is that a customer may download a significant number of recordings for "previewing" as described above, and maintain those recordings in intermediate storage for a considerable period of time before having to make a decision on whether to make (and pay for) permanent copies. However, this large intermediate storage capacity opens up other possibilities, as well. For example, according to one manner of carrying out the invention, the system operator may automatically (i.e., without requiring customer preselection) download certain very popular recordings to every customer storage module on a periodic basis, such as 1 to 10 featured CD's every day. At 5 automatically downloaded CD's per day to each customer, an 80 CD storage capacity and a "first in, first out" write-over protocol would permit each automatically downloaded CD to remain in the intermediate storage of storage module 130 and available for on-demand permanent recording for approximately 15 days, with the exact time depending upon how many customer-selected recordings are downloaded during that period. Thus, over any 15 day period, the system operator may automatically make available (at 5 automatic downloads per day) 75 popular recordings for all customers, without the customers having to preselect anything. Of course, the preselection option for all catalog music remains available at all times. It will be appreciated that the automatic downloading of recordings to all customer user stations can be readily achieved by the system operator simply communicating (e.g., daily) to all user stations the ID header information for that day's automatically downloaded recordings. The user station downloads recordings to the intermediate storage in storage module 130 just as if the recording had been preselected by the customer. The graphical user interface alerts the customer that the recordings are available by a cue such as "YOU'VE GOT TUNES".

7. Using Customer Preference Information

Figure 9:
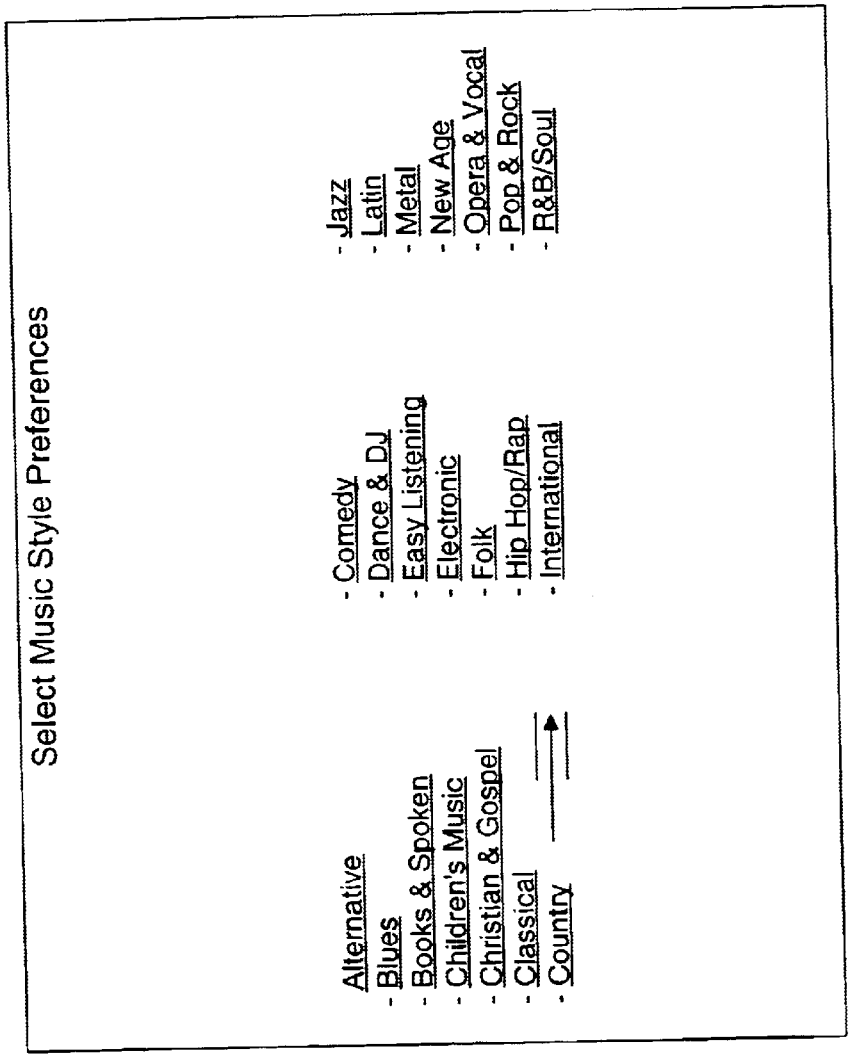
FIG. 9 shows a screen containing one example of a simple graphical user interface used by a customer to enter customer music preference information by music style.

In a more customer-specific manner of carrying out the invention, different sets of recordings are automatically downloaded at customer user stations according to the music preferences of the customer. For example, each customer may use the graphical user interface (see FIG. 9) to select those music styles (e.g., classical, country, new age) they most prefer. The system operator uses this information to tailor the automatic downloads to that customer's user station accordingly. In a simple application, the system operator may create, for example, 10 to 20 standard customer profiles so that each customer receives automatic downloads for the one of those profiles which he most closely matches. The objective is for the intermediate storage to have available for on-demand recording a large percentage of the recordings that any particular customer may be interested in at any given time—or at least have those recordings available to the customer over a period of time as new entries into intermediate storage overwrite older entries, recognizing that at all times the customer is free to order any music selection from the catalog.

Figure 10:
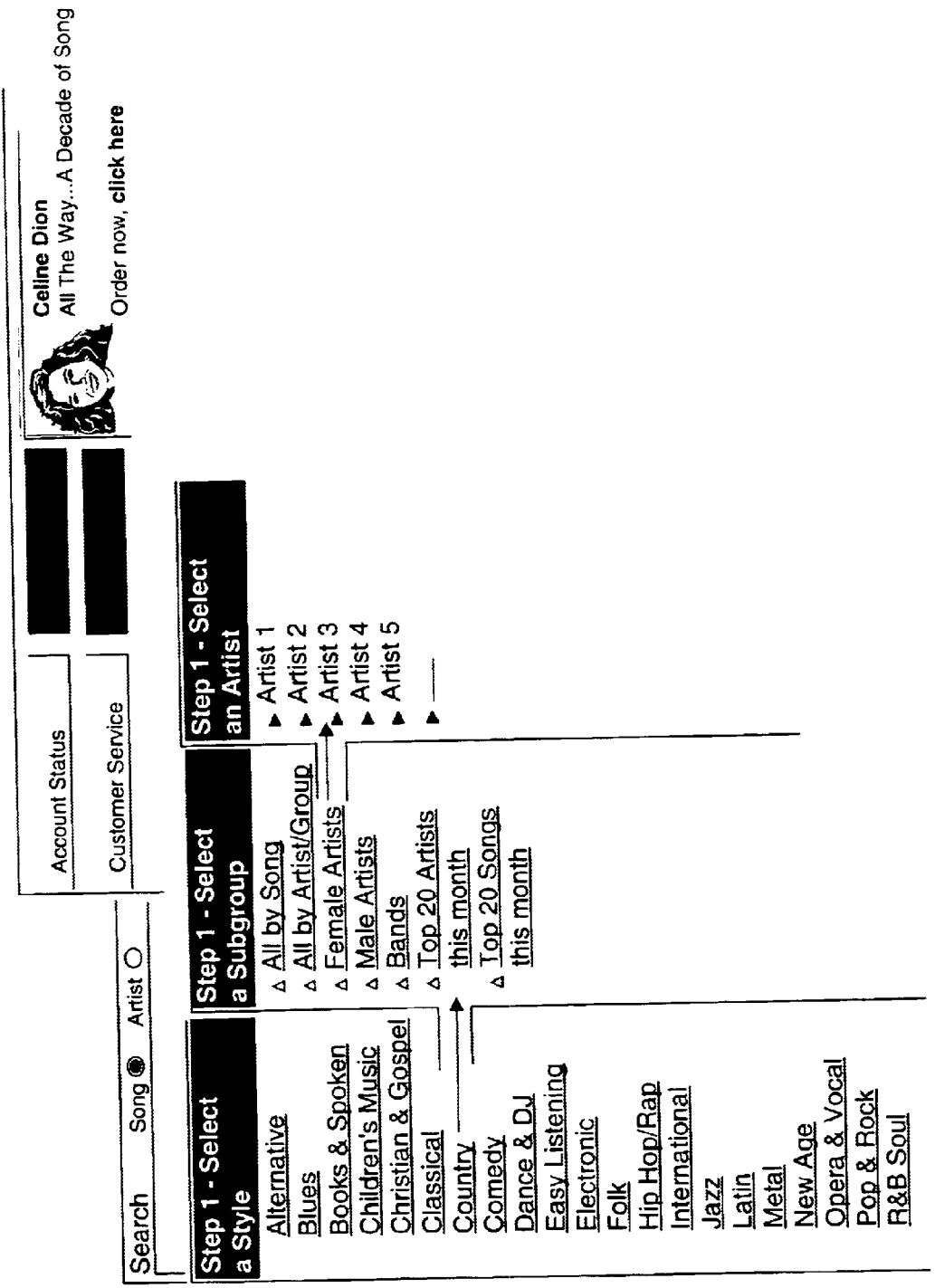
FIG. 10 shows a screen containing another example of a graphical user interface for entering more complex, multi-level customer preference information.

As described above, the system operator may create, for example, 10 to 20 customer profiles and assign each customer to one of these profiles according to music preference information entered by the customer. Thereafter, the customer receives (e.g., daily) the set of automatically downloaded recordings for his particular profile category. However, in other embodiments of the invention, customer preference information may also be used in a more sophisticated fashion to tailor the profiles to the individual tastes of a customer or the tastes of the customer household family members. To this end, the customer may use the graphical user interface (FIG. 10) to enter music preferences at a desired level of detail. As shown in FIG. 10, a first level of detail is the selection of one or several styles of music (similar to the selection made in connection with FIG. 9). In addition, the customer may go to a second step where each selected style may be further subdivided by, for example, female artists, male artists, top twenty artists this month, top twenty songs this month, etc. A third level of selection permits identification of specific artists. Other means for subdividing interest areas under a particular style of music be used (e.g., jazz/saxophone, classical/opera/tenors). However the expression of musical preferences is made, this information may be used alone, or in conjunction with other information, to permit the customer's user station to download to intermediate memory (e.g., 80 CD capacity) an ongoing, rolling selection of recordings that will most likely match the preferences of the customer.

Figure 11:
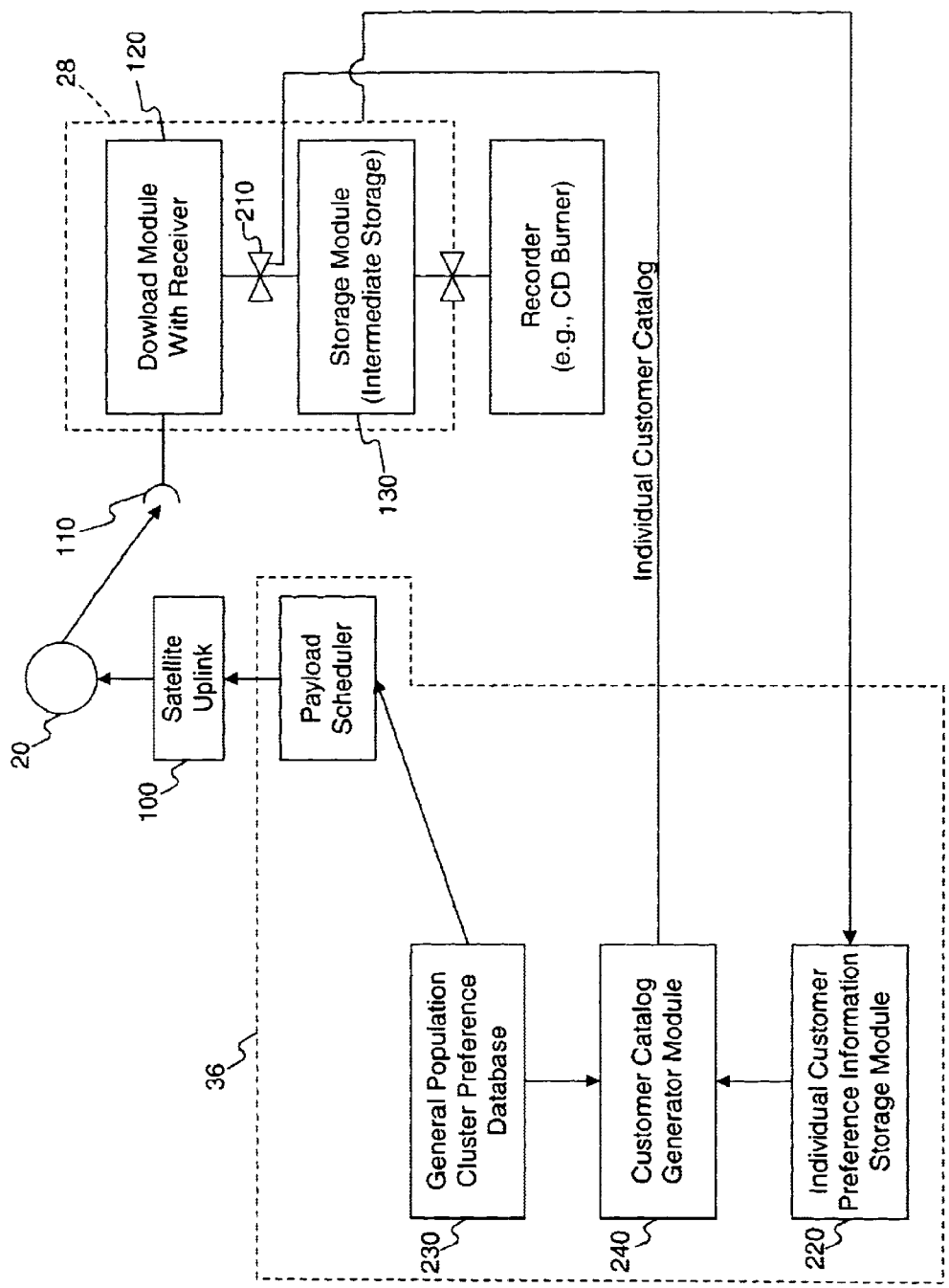
FIG. 11 is a block diagram showing how customer preference information entered by customers and general population clustered preference data compiled and analyzed by the system operator are used to create customized preference-based downloading choices at the customer user stations.

Referring to FIG. 11, there is shown a block diagram that illustrates in schematic form the generation and use of customer preference information. FIG. 11 shows portions of user station 28, namely, the download module 120 with receiver and the storage module 130 for intermediate music storage. The recorder for permanently recording music (e.g., CD burner) is also shown. As schematically shown between user station 28 and storage module 130, apparatus 210 serves to read the ID headers on all of the broadcast music recordings and select for downloading only those that are indicated as being desirable to the customer by the processed music preference information.

FIG. 11 also shows portions of central controller 36 that store and analyze customer preference information and customer order information, and generate from that information the individualized "customer catalog" that determines which recordings will be automatically downloaded at that customer's user station. To this end, controller 36 includes an individual customer preference information storage module 220, a general population cluster preference database 230 and a customer catalog generator module 240. Each customer's preference information is entered in the manner described above via the graphical user interface and is communicated to module 220 by phone/modem. In addition, the preference information of the entire customer population (or some subset thereof), as well as order data, is stored in module 230. Information from modules 220 and 230 is analyzed to create an individual "customer catalog" for each customer via module 240. The individual customer catalog data is communicated to the user station in each customer household and serves to assure that those recordings that best fit the preference customer profile are the ones that are downloaded to storage module 130. While a first-in, first-out protocol may be used for overwriting onto the hard drive of module 130, the customer catalog information may serve to establish a different protocol that will overwrite the less likely to be purchased recordings ahead of those recordings which, by analysis at module 240, show more promise of being purchased. Certain new release recordings in high demand within the customer's primary areas of interest may be designated to remain in intermediate storage for a minimum period of time, say one week, regardless of the "traffic" through storage module 130.

Along with music, there is blanket transmission of catalogs and other advertising or customer interest information. The storage and display of this information may be based on customer profiles. For example, an advertisement for a new CD that is expected to appeal to young adults, country music fans, and customers living in North Carolina would have this information contained in its header, and the receiver would recognize if any of its users are in any of these categories and will appropriately store or not store this advertisement on the hard drive, and may determine to display or not display this ad on the user's TV catalog. Similarly, advertisements for other related merchandise, like Willie Nelson hair bands, might also be displayed. Text describing individual artists or related events might also be stored with the catalog.

Figure 12:
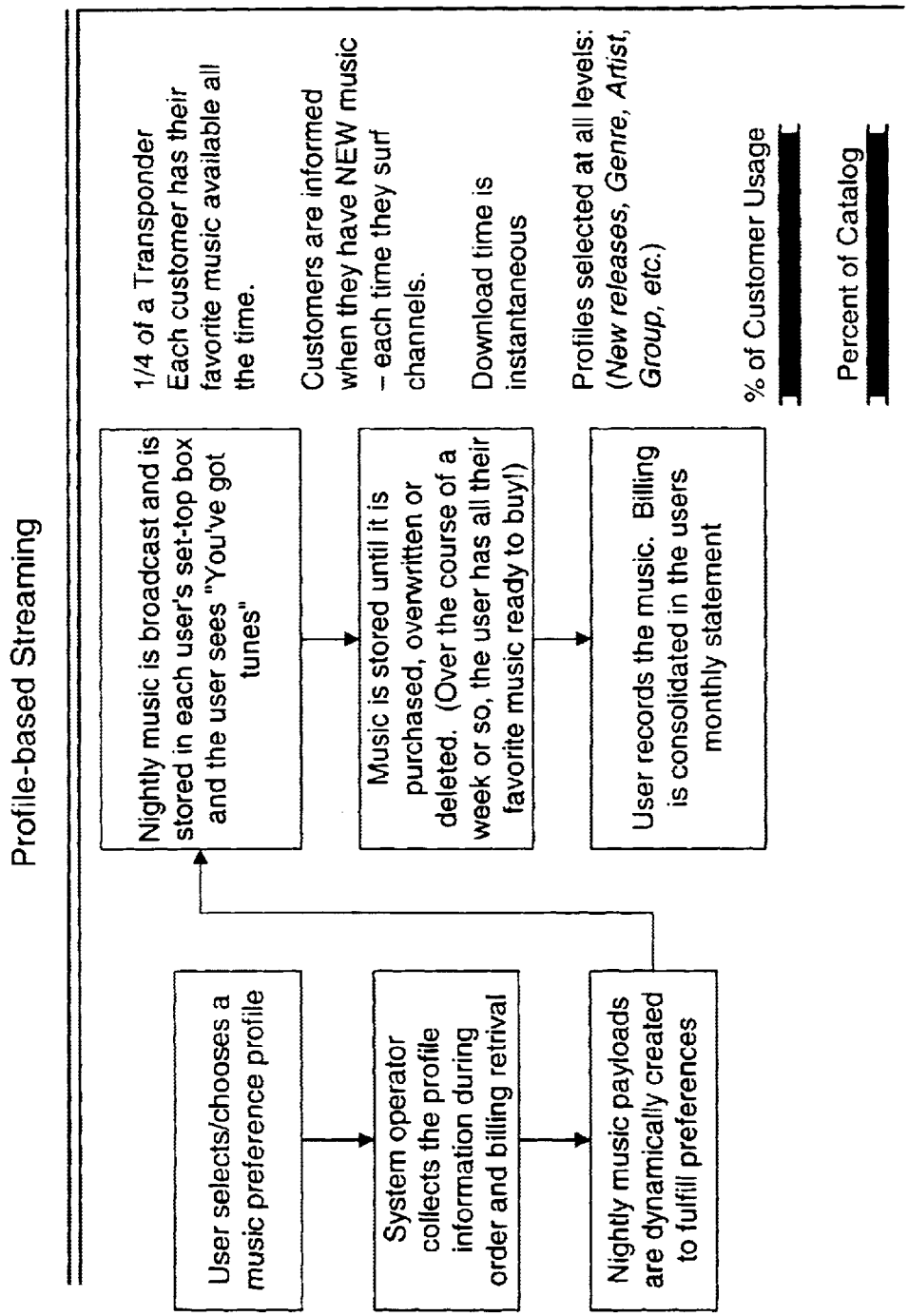
FIG. 12 is a flow sheet showing the streaming of music at night based upon profile analysis.

FIG. 12 is a block diagram showing how the customer profile information is also used to assist in dynamically creating nightly music payloads.

8. Promotional-based Streaming

Figure 13:
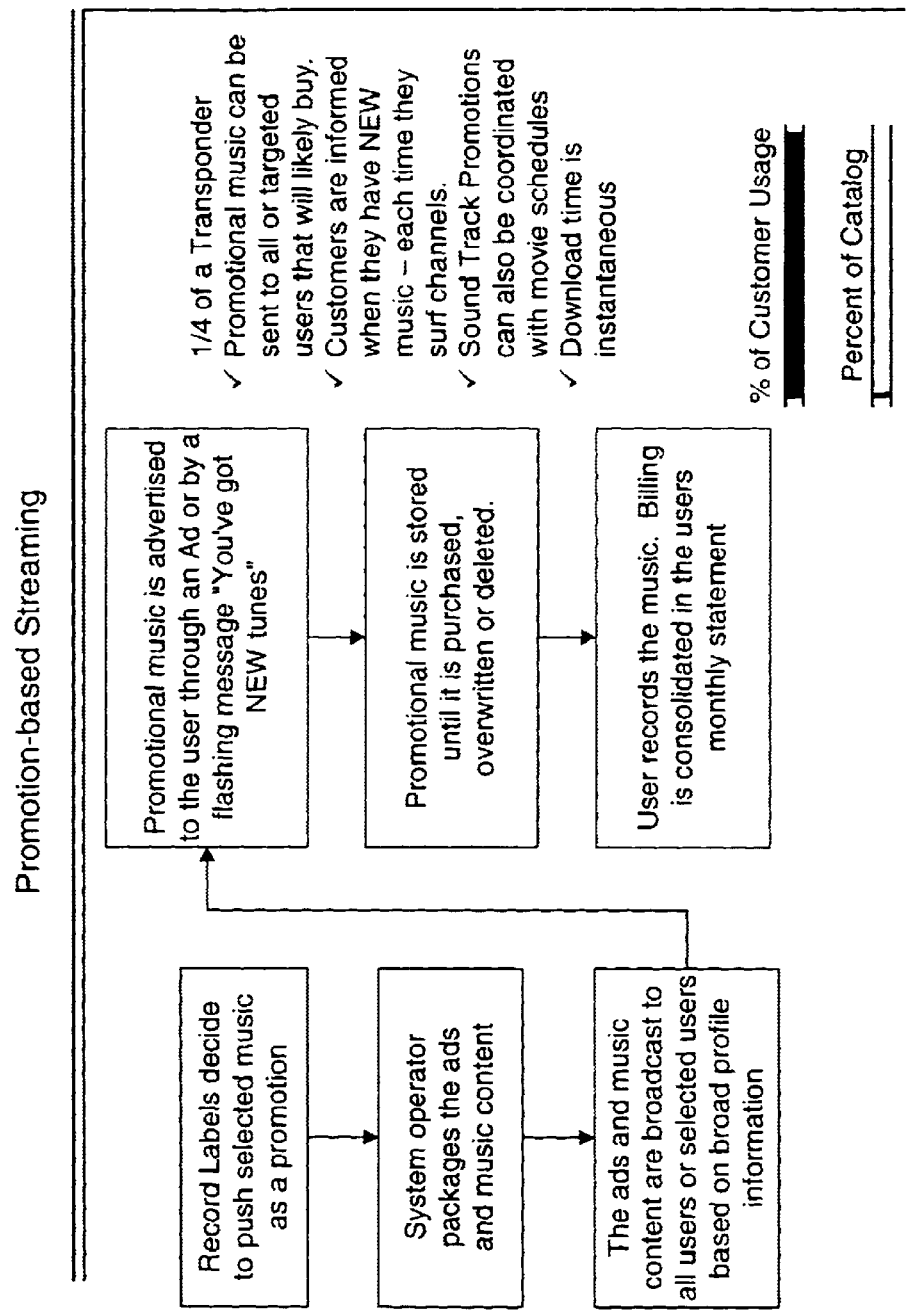
FIG. 13 is a flow sheet showing the procedure for promotion-based streaming of music, for example where a record label decides to push a selected musical recording as a promotion.

FIG. 13 shows the use of promotion-based streaming to download recordings at customer user stations. A content provider (e.g., record label) may decide to push a selected recording as a promotion. The system operator packages the advertisements and music and then broadcasts them for automatic downloading by all customers or by a selected group of customers based on the broad profile information developed by the operator (FIG. 11). The promotional music is advertised to the customers through an advertisement (see top right corner of FIG. 10) or by a flashing message such as, "YOU'VE GOT NEW TUNES". Promotional music is stored in intermediate storage until it is purchased, overwritten or deleted. As with the other means of purchasing music, once the customer permanently records, the billing is consolidated in the customer's monthly statement. Promotional-based streaming may be accomplished typically in a relatively short period of time using appropriate bandwidth (e.g., one quarter transponder).

Promotions may include movie soundtracks for movies that are being broadcast by DBS or cable. In this situation, prior to broadcast of the movie, the soundtrack is broadcast and automatically downloaded to all user stations. When the movie is broadcast, viewers of the movie are informed that the soundtrack for the very movie they are viewing is on their hard drive and available for immediate on-demand purchase. Purchases may be made during the movie by appropriate means; for example, a translucent icon may appear on the screen and purchase made by simply clicking on the icon. Or, the purchase can simply be made at the conclusion of the movie where, preferably, viewers are reminded that the soundtrack is available on their hard drive for on-demand purchase.

Figure 14:
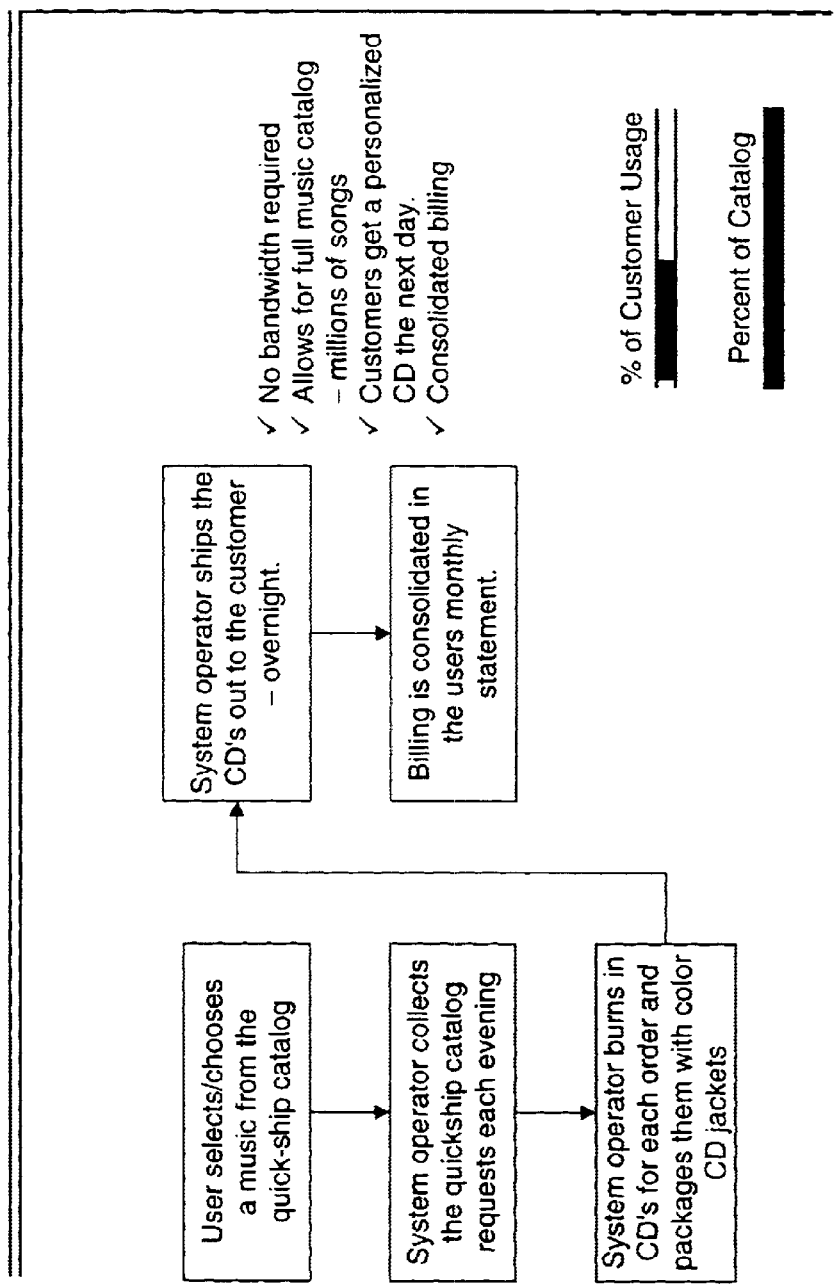
FIG. 14 is a flow sheet showing a procedure for quick-shipping CD recordings overnight from an automated CD production facility.

FIG. 14 shows how an automated CD production facility coupled with a "quick-ship overnight" delivery operation may be used for low volume CD's (i.e., CD's not frequently requested) or for customers who do not have their own CD burner. (Further details of the operation of the facility are discussed later in the specification.) When a customer selects a recording from the quick-ship catalog or a selected recording is designated by the system operator for quick-ship due to low demand that does not justify broadcast, the system operator collects the requests in the evening and then burns in the requested CD's for each order and packages them with color CD jackets. The CD's are shipped to the customers overnight and billing is consolidated into the customer's monthly statement. Advantages of the quick-ship overnight option include the ability to provide CD's without utilizing bandwidth and the provision of the full music catalog that comprises millions of songs, many of which cannot be broadcast.

FIG. 15 is a chart listing the above-described music delivery schemes and showing their respective availability status with respect to customers with and without CD burners.

9. Ensuring Flawless CD's Using Checksums and Multiple Downloads

Satellite receivers do not have perfect reception due to the tradeoff between electrical power and bandwidth of the satellite. Weather conditions, motion of atmosphere layers or obstructions between the dish and the satellite may interrupt the signal. A momentary loss of bits will cause a TV image to freeze for a frame or two, while longer interruptions will cause reception to blank. Whereas a short loss in video is a couple of frozen frames, data loss in audio may leave a glaring blank in the music. Therefore, a satellite system for transmission of audio or software (or video) CD's requires a method to detect and fix data losses at the receiver.

Patching data "potholes" requires a method for sensing potholes and another for placing asphalt to fill them. Typically, digital data is sent in packets of bits (perhaps one thousand bits at a time with each packet containing 1/40 second of music). Loss of bits within a packet can be detected by error codes or merely a "checksum" at the end of the packet which indicates the sum of all the sent bits. Each packet may have an identifying number so that loss of an entire packet is noticed. This is all conventional Internet technology.

Repairing data loss might be accomplished by replacing an occasional packet by the receiver asking for a copy of the packet via an Internet or modem phone connection. However, the frequency of data loss and amount of contiguous data might be lost (for instance, during a rainstorm), requires a wider bandwidth, like the satellite, to provide the material to repair data loss.

Therefore, in certain embodiments, the present invention provides the capability in the system to detect bit losses and receive a second copy of the selection and use all or part of that copy to patch the missing or corrupted bits or packets in the original download. This would require storing a requested download on the storage medium (e.g., hard drive), checking for missing data, informing the customer that the download was imperfect (allowing the customer to burn a CD, listen to a preview or wait for a second transmission), then receiving and storing all or part of a second (or rarely a third) transmission, and then selecting good packets of bits to make up the final copy.

In practice, a customer selects a CD via the TV-remote interface and the TV screen notes a download, say, 45 minutes later. As soon as the download is completed, the customer is informed of the quality of the download (A, B, C, D) and informed of the time of the next transmission of the material. The customer is then allowed to preview the corrupted version, or even burn a CD if they wished.

10. Distributing Low Request CD's Via an Automated CD Production Facility

In conjunction with blanket transmission of more popular music, a central facility (FIG. 6) may be provided to manufacture low-volume CD's (i.e., CD's that are not frequently requested) and distribute them by ground transportation. A system of the invention that includes such a production facility carries low-volume products from record company master music libraries to meet the needs of those companies to sell all of their archives. Typical satellite costs may require at least 5 to 10 purchases per satellite transmission to pay for the transmission costs. Backing satellite transmission with shipped CD's also provides CD's for locations where poor satellite reception makes it difficult to get a clean CD download, or to people who do not have a dish. Preferably, the automated burner facility:

a. takes orders from receivers with modems or via an Internet site;

b. has electronic access to the music libraries of the satellite system via Internet or local storage;

c. has totally automated CD burners, CD painters, jacket printers, packaging, labeling, shipping and billing;

d. encodes ID tags/watermarks in all manufactured CD's to deter illegal copying; and e. is located at a single central or multiple regional locations.

Because each CD is manufactured upon request from blank writeable CD's, totally automated production and distribution is possible resulting in low production and distribution costs compared to a typical CD store. The facility may also manufacture music recordings on other media such as DVD's, MD's and other digital media. Additionally, the facility could manufacture videos and software.

11. Piracy Protection

The threat of piracy can be controlled through a music distribution system that uniquely labels every legal CD copy of music (or video) with an "ID tag". Thus, if a customer sells copies of a CD that he purchased, that copy and any copies of it can be traced to his original purchase. Such identification serves as the basis of a legal deterrent for large or small-scale piracy. Furthermore, the ID tag may be contained in each song of a CD protecting each complete piece of artistic material. The ID tag may be as simple as an inaudible millisecond blip at the start of each selection or may be "woven" into the music so that it survives re-recording and compression schemes by being integral to the music, but not noticeable to the listener or easily discovered and removed by potential pirates. Multiple hidden tags may be used to discourage attempts to remove the code by comparing multiple legal copies of the music. Similarly, multiple tags also provide the advantage of identifying illegal copies in those cases where a pirate successfully removes some, but not all, of the tags. At worst, a pirate may successfully remove part of the tags making it possible to determine that the music copy is illegal, but without identifying the original purchaser.

Distributing music that contains unique ID tags limits piracy by making it possible to prove that a CD is an illegal copy and makes the legal source of the copy identifiable. This technology makes it financially feasible to distribute full-quality CD music (or video) to consumers via direct satellite connections in the manner described above in connection with FIGS. 1–4. Furthermore, by placing tags in each song, it makes it possible to have a protected system of allowing consumers to create unique assortments of songs on a CD, and for artists and distributors (content providers) to receive revenues for each song used. Thus, each home can become a "CD or music factory" where a person can create their own collection of songs by artists, through a system in which the original artist and distributor are properly paid for their materials. Furthermore, the decline in piracy resulting from the threat of legal prosecution could result in more legal copies of music being purchased so that providers can charge less per legal copy so that this art is more widely available.

Two major venues contemplated for distribution of protected CD's are the Internet and satellite. In the Internet case, a customer contacts an Internet site where they purchase the CD. The site places ID Tags in the music or video selected, then compresses the selection and sends it to the purchaser. The purchaser then de-compresses (inflates) the selection and stores it on his hard drive or writes it to a blank CD for later playing. In the case of satellite distribution, a customer contracts over a phone or Internet connection to purchase a particular CD. At scheduled times, perhaps once a day, the satellite company compresses this CD, encrypts it and then blanket broadcasts it. The customer's receiver (e.g., user station 28, above) stores the transmission and then de-encrypts it using a system and key supplied by the satellite company, and then that same system encodes an ID tag in the music (or soundtrack) using a tag number downloaded from the satellite company during the purchasing transaction. Both the Internet delivery system and the satellite delivery system create a customer CD that may be played on any conventional CD player. Both the Internet and satellite distribution systems archive the ID tag information with the customer's identity and perhaps other aspects of the transaction. This data may be sent back to the original content provider or to another company specializing in detecting and prosecuting pirates.

The above scheme may also be applied to CD's sold in stores. In this case, each CD has a unique ID tag encoded before it is distributed to the store. The CD case has a bar code associated with the ID Tag. At the time of purchase the bar code is associated with a customer's charge card or identity. This information is then sent back to the CD manufacturer.

It will be appreciated that it is possible to encode an ID tag into a music selection so that it will not be heard during normal playback, but could remain and be detectable in a recording made from a selection played over the radio.

The description will now turn to a detailed discussion of representative ID tags. As stated above, an ID tag uniquely identifies each copy of music or video. In its most simple form, a 10 digit (37 bit) tag may be stored in three 16-bit samples ($\frac{1}{12,000}$ of a second long) on a CD. A three-byte tag number equivalent to full volume is a barely perceptible pop to young, sensitive ears and is completely inaudible to the majority of the population. In a more complex form, the tag may be woven into the frequency or time spectrum of the music, where it is both inaudible and survives compression and transmission, or even serious attempts by hackers to remove the tag. While the simple tag may be appropriate for certain applications, more complex tags may be desired for other applications, especially for high-profit, piracy-prone contemporary music (or video).

A simple tag, as discussed immediately above, may consist of three 16-bit numbers placed at the start and/or end instant of a CD or each of its songs. To limit audibility, the 37 bits may be carried by the 64 bits of the first four samples at the beginning of the CD and encoded to have low amplitude or alternating polarity to further hide its audible presence from consumers. Such a tag may be easily read by a computer and is not difficult to eliminate when making copies. However, the technical nature of tag removal coupled with the legal implications of distributing software capable of destroying the tag serves as a significant deterrent to general piracy.

The complex ID tag is inaudible by humans, yet is sufficiently integral to the music (or video) that it remains during simple filtering or compression operations. The ID tag may be a multidigit number (or collection of bits) that can be read or recovered from the CD by those who originally placed the tag. Examples of tags are low bit-rate encoding in low amplitude, increase or reduction of high frequency music content, short-duration ratios of harmonic components, background sounds, slight shortening or lengthening of sustained sounds, or even localization cues or echoes for a sound object. Key to "hiding" the sounds is to encode the bits as short duration shifts in the sounds, shifts that are preserved during compression but that are not detectable by normal human hearing or attention. In other words, it is desirable to take advantage of the parts of the music that have "excess information" coded during sound compression that is not noticed by humans.

To make the complex tag hidden and recoverable additional information may be used in reading the tag that is not contained in the CD. This information describes where the real (or perhaps false) ID tags are to be placed, and what the nature of the bit encoding is at that location. The simplest form of location would be milliseconds from the start or end of the song for each bit. Similarly, time from a particular feature in a song, like milliseconds after the attack greater than 20 dB about 23 seconds into the song, could be used to identify the location of one bit of an ID tag. Obviously many bits are also encoded that obscure the actual tag bits. Real and actual bits may be different or interchanged among different legal copies of a song.

It should be expected that as music (or video) compression techniques evolve, methods for placing and retrieving ID tags will also evolve.

In its simplest form, the ID tag is a unique identifying number, ID number, that is placed at the start, end or between selections on a copy of the CD when it is produced for the consumer. As stated above, a unique ID number might be placed on each CD as it is manufactured and later associated with a customer name or credit card during a store purchase. Or, in one preferred manner of carrying out the inventions, the ID number might be inserted during the process of writing a CD with music that is downloaded from a satellite or the Internet. In this case, the software accomplishing the transaction to purchase the music also sees that the ID number is obtained from the seller and places this ID number at appropriate places in the CD during the recording process.

Looking at a more complex form of the ID tag, when a legal CD is distributed over the Internet, via direct satellite transmission or even CD's that are manufactured for sale in CD stores, preferably two blocks of information are involved. The first block, called the "location data", is an encrypted description of all the locations in the music to contain the entire or part of the ID tag, and the encoding techniques used for each location in which false or real bits of the ID tag will be placed. The location data is used in creating or reading the ID number but is not stored on the CD. The second block of information, called the ID number, is a unique number identifying the legal transaction. The ID number may be a customer identification number, like a credit card or phone number, or customer purchasing account number, or may be a seller generated transaction number. There are many different schemes for filling redundant ID tags encoded on a CD so that tampering or removal of any tag or part of a tag is noticed.

Some types of tags may be placed in the time domain and others in the frequency domain. Time domain tags may involve changing an aspect of a time-domain feature like the decay time for a note, whereas frequency domain features such as amplitude of an overtone would be better inserted in a frequency domain transform like the fast Fourier transform used to do MPEG compression. The amount of computer speed needed to insert frequency domain tags has only been recently available in consumer computers.

Location data is communicated to a "home music factory" (e.g., user station 28) as encrypted information sent with the compressed music. If an ID number were 10 digits (about 33 bits) long then perhaps just 33 or several hundred locations would be contained in the location data. Software may accomplish this task at the site of music distribution, picking regions of the sound that are suitable for hiding bits within, or trial bits may be encoded by software with trained observers, perhaps the person who mixed or originated the music confirming that the music was not degraded by the inclusion of the bits.

ID numbers would be contained in the music factory as a standard ID number or as a number securely given to the purchaser during the purchase transaction. One number might be given for a whole CD or individual numbers for each song on the CD might be given.

The customer's security information should not only contain the location data and ID tag but instructions for creating each type of encoding of a bit in the fabric of the music. Types and encoding of bits may be kept secret so that the search and removal of encoded ID's will be more difficult. It is also likely that types of encoded cues will evolve over time.

Note that a unique ID tag can be encoded in the manufacture of a CD for sales in a store as well as a bar coded copy on the CD box allowing association of a purchaser's identity (or credit card number) with that legal copy. Similarly CD's delivered in compressed form over the Internet can have the complex tags woven into the audio at the delivery end. Complex tags can be designed that are not affected by the compression-decompression process.

A simple ID tag consisting of three two-byte samples could easily, but illegally, be eliminated during a piracy operation with the proper software. However the more complex encoding schemes are very difficult to find in order to eliminate or change it.

To be immune from destruction the encoded bits need not affect a person's perception of the music. This is not difficult since the information content of even compressed music is orders of magnitude beyond the capacity of humans to take in information. However, since humans attend to different aspects of music at different times, encoding must be carefully done.

Hints of types of acceptable encoding come from knowledge of what aspects of sound are most carefully attended by humans. For example, quick rise-times or strong attacks are carefully processed for localization cues, and frequency or pitch can be sensed with great accuracy by some persons. The literature on the development of music compression algorithms contains discussions of what aspects of music must be carefully preserved and what is less noticed but nevertheless kept due to the need to preserve other, similar, features in the encoding.

It will be appreciated that it is possible to place both a simple and a complex ID number on a CD as a method to determine the purchaser of a CD that was subsequently altered and copied.

A final matter with respect to antipiracy protection is that the "hidden" ID tag data in the music should survive compression. By way of background, music (or audio) is typically made digital by sampling the music 44,000 times a second with a resolution of 16 to 20 bits. The number of samples is necessary to record the highest frequencies, the resolution allows 90 to 120 db of dynamic range above noise. All compression techniques reduce the information necessary to digitally communicate the music. The primary basis of commercial compression techniques is to reduce resolution in frequency bands that will be least noticed by the human ear. This is true for ISO/MPEG, Sony ATRAC and Phillips PASC. To achieve the five or ten fold compression, all these techniques work with 500 to 1000 point blocks of samples (10 to 20 milliseconds), establish a realistic resolution for each of 30 to 50 frequency bands based upon the threshold of human hearing and masking by sounds of similar pitch, and then represent the various spectral components of the sound with as few bits as possible. For example, ATRAC averages 2.8 bits per sample to get the equivalent of 20 bits pre sample of resolution. Some compression techniques also make use of redundancy between stereo channels. Thus, all common compression techniques focus a minimum number of bits to represent each 10 to 20 milliseconds of sound, and trying to place an ID tag or "watermark" in this texture will likely affect the sound. Compression methods work with small chunks of sound because computation required for spectral filtering techniques (like the FFT) increases drastically as samples lengthen, and because this sort of compression represents the "low hanging fruit" in reducing the data needed to convey sounds. With compression focused on the information in short blocks of sound it is a good strategy to look for ID tag/watermarking methods that are inaudible features that extend across blocks and are therefore to be unaffected by compression. Current audio watermarking techniques convey information by putting notches in high frequency sounds, low amplitude sounds spectrally adjacent to louder tones, influencing least significant bits of encoding and short echoes. Known watermarking techniques place marks within the single blocks of sound to be compressed. Several aspects of the ID tag/watermarking aspect of the present invention differ from conventional watermarking:

a. it is necessary to convey only a couple of dozen bits in a song;

b. an entire song may be held and processed at once in memory (e.g., hard disk) with substantial processing power being available to do the watermarking; and c. the location and nature of the watermarking sites can be kept confidential.

According to the invention, ID tags/watermarks may be based upon undetectable changes, located by features in the referenced to the rough length of the piece. These features may be subtle shifts in the texture of the music, like relative amplitude between channels of a narrow range of frequencies, or duration of time between features. While the ear is very sensitive to time interaurally or as a component of the onset of a sound, time is looser with respect to time between features in the music, yet time is precisely preserved by compression techniques. It is theoretically possible to time the duration between two attacks to 20 microseconds. In practical terms, noticing a 50% rise in a 500 Hz attack may be timed to less than 200 microseconds. In contrast the time scale that humans perceive the timing of sequential events is in the range of 10 milliseconds (10000 microseconds), opening a 50:1 window for encoding and perceiving slight timing shifts that carry an ID tag. Attacks may be used because they are both easy to detect and have sharp temporal features allowing accurate determination of time to make interval measurement more precise. In practice, ten digits may be encoded between 10 to 30 attacks by slightly lengthening the duration of sound between attacks without any alterations in pitch. To accomplish this task, software must recognize the existence of attacks and simple decays that can be extended. In some sorts of music, like single instrument works, this is simple. Other types of music typically require more work to achieve without any perceptible alteration in the music. In this regard, vocoder technologies that can stretch time without altering pitch provide existing techniques for accomplishing this. After a pair of attacks had been located in the music, these locations are measured as a fraction of the duration of the entire selection. The length of the delay encodes one or several bits of the ID tag. Then an appropriate length of the music between the two attacks is lengthened the desired amount, say 500 microseconds. The lengthening preferably is applied to all channels of the music. To read an ID tag, the original pairs of attacks are approximately located as a fraction of the duration of the whole selection. Then the attacks are exactly located by moving forward several milliseconds in the altered music until they are recognized and their positions pinpointed. The duration between is measured and compared to the original amount. Added or removed time codes individual bits or digits. Subsequent pairs may be located relative to earlier skewed pairs.

It will be appreciated that security of the music may be enhanced by periodically changing the encryption keys. For example, when using satellite as the blanket transmission means, 1024 bit RSA encryption keys may be used and changed periodically, with the changes being downloaded to the satellite receivers of the customers.

12. Business Models

Figure 5:
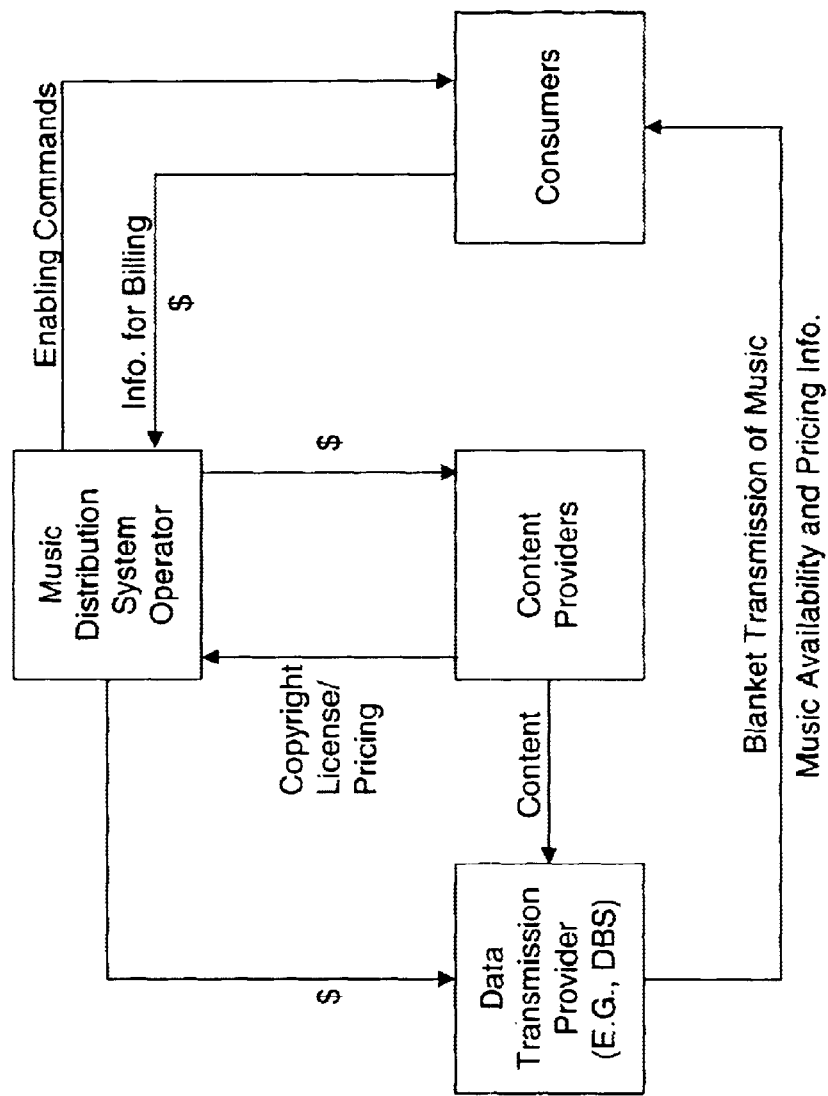
FIG. 5 is a block diagram of one simplified embodiment of a business model for commercializing a music distribution system.

The present invention provides significant flexibility with respect to the business model to be used to commercialize the invention. In one simplified embodiment, shown in block diagram form in FIG. 5, the music distribution system operator interfaces with three parties, the data transmission provider, the content providers, and consumers. The content providers provide content to the data transmission provider which, in turn, blanket transmits the content to the consumers, preferably by direct broadcast satellite. The satellite transmission also includes content availability/scheduling data and content pricing data, updated periodically. The content providers also provide copyright license and pricing requirements to the music distribution system operator. Both the data transmission provider and the content providers receive payments directly from the music distribution system operator. Lastly, the music distribution system operator periodically receives information for billing, while also sending enabling commands to the consumers.

While the present invention has been described in connection with certain illustrated embodiments, it will be appreciated that modifications may be made without departing from the true spirit and scope of the invention.

What is claimed is:

1. A method of distributing digitally encoded data files comprising:
    classifying a plurality of digitally encoded data files as belonging to at least one of a plurality of categories;
    integrating an ID tag into the digitally encoded data files;
    storing user preference information including information identifying at least one of the categories of digitally encoded data files associated with a user;
    blanket transmitting a plurality of digitally encoded data files including at least one digitally encoded data file belonging to a category identified in the user preference information for a user;
    automatically storing the identified digitally-encoded data file at a location of the user;
    permitting the user to purchase the stored digitally encoded data file, the digitally encoded data file including the anti-piracy ID tag; and
    communicating the fact of the purchase to a central control system for billing the user.

2. The method of claim 1, wherein managing customer preference information further includes:
    creating a standard user profile identifying at least one of the categories, and
    matching a user to the standard user profile.

3. The method of claim 2, wherein matching a user to the standard profile further includes receiving from a user a selection of the standard profile.

4. The method of claim 1, wherein automatically storing further comprises overwriting a digitally encoded data file previously stored in the storage medium based on the age of the previously stored data file.

5. The method of claim 1, wherein automatically storing further comprises overwriting a digitally encoded data file previously stored in the storage medium using a first In first out priority scheme.

6. The method of claim 1, wherein automatically storing further comprises overwriting a digitally encoded data file previously stored in the storage medium based on the demand for the previously stored digitally encoded data file.

7. The method of claim 1, wherein the digitally encoded data file includes a header, the method further comprising:
    including, in the header of the digitally encoded data file, information identifying a category to which the digitally encode data file belongs.

8. The method of claim 7, wherein automatically storing further comprises selecting a digitally encoded data file from the blanket transmission a data file containing a header identifying a category identified by the user's preference information.

9. The method of claim 1, further including:
    creating a user-specific advertisement for a digitally encoded data file using the user preference information for that user;
    transmitting the user-specific catalog to the user;
    receiving an order from the user for a data file identified in the catalog, for the user location to store the ordered data file upon transmission.

10. The method of claim 9, wherein the advertisement is a catalog containing an advertisement for each of a plurality of digitally encoded data files belonging to a category identified in the user's preference information.

11. The method of claim 9, further including creating at a production facility a copy of the ordered digitally encoded data file for shipping to the user.

12. The method of claim 1, wherein at least one of the digitally encoded data file is a promotional data file comprising promotional information about other digitally encoded data files.

13. The method of claim 1, wherein the digitally encoded data file comprises digitally encoded music.

14. The method of claim 1, wherein the digitally encoded data file comprises digitally encoded video.

15. A system for distributing digitally encoded data files, wherein each digitally encoded data file belongs to one or more categories, comprising:
    an encoder integrating an ID tag into the digitally encoded data files;
    a user preference storage module storing user preference information including information identifying at least one of the categories of digitally encoded data files associated with the user;
    a first transmitter blanket transmitting a plurality of digitally encoded data files including at least one digitally encoded data file belonging to a category identified in the user preference information for a user;
    a download module automatically storing the identified digitally-encoded data file at a location of the user;
    an input receiving a user selection of the stored digitally encoded data file for purchase, the digitally encoded data file including the anti-piracy ID tag; and
    a second transmitter communicating the fact of the purchase to a central control system for billing the user.

16. The system of claim 15, wherein the user preference storage module comprises a standard user profile identifying at least one of the categories to which a user may be matched.

17. The system of claim 16, further comprising a user interface receiving a user selection of the standard profile.

18. The system of claim 15, wherein the download module overwrites a digitally encoded data file previously stored in the storage medium based on the age of the previously stored data file.

19. The system of claim 15, wherein the download module overwrites a digitally encoded data file previously stored in the storage medium using a First-In, First-Out priority scheme.

20. The system of claim 15, wherein the download module overwrites a digitally encoded data file previously stored in the storage medium based on the demand for the previously stored digitally encoded data file.

21. The system of claim 15, wherein the digitally encoded data file includes a header, the system further comprising:

an encoder integrating, into the header of the digitally encoded data file, information identifying a category to which the digitally encode data file belongs.

22. The system of claim 15, wherein the download module further selects a digitally encoded data file from the blanket transmission a data file containing a header identifying a category identified by the user's preference information.

23. The system of claim 15, further including:

a catalog generator module creating a user-specific advertisement for a digitally encoded data file using the user preference information for that user.

24. The system of claim 23, further including an input receiving an order from the user for a data file identified in the advertisement, for the user location to store the ordered data file upon transmission.

25. The system of claim 23, wherein the advertisement is a catalog containing an advertisement for each of a plurality of digitally encoded data files belonging to a category identified in the user's preference information.

26. The system of claim 24, further including a production facility creating a copy of the ordered digitally encoded data file for shipping to the user.

27. The system of claim 15, wherein the digitally encoded data file is a promotional data file comprising promotional information about other digitally encoded data files.

28. The method of claim 15, wherein the digitally encoded data file comprises digitally encoded music.

29. The method of claim 15, wherein the digitally encoded data file comprises digitally encoded video.

30. A method of distributing digitally encoded data files comprising:

classifying a plurality of digitally encoded data files as belonging to at least one of a plurality of categories;

storing user preference information including information identifying at least one of the categories of digitally encoded data files associated with a user;

blanket transmitting a plurality of digitally encoded data files, wherein the plurality of digitally encoded data files includes at least one digitally encoded data file belonging to a category identified in the user preference information for a user, for storage at the user's location;

receiving from the user an indication of a purchase of the stored digitally encoded data file, the digitally encoded data file including an anti-piracy ID tag; and using the indication of purchase to bill the user for the purchase of the digitally encoded data file.

31. A system for distributing a digitally encoded data file, wherein the digitally encoded data file belongs to at least one of a plurality of categories, the system comprising:

a storage module storing user preference information including information identifying at least one of the categories of digitally encoded data files associated with a user;

a transmitter blanket transmitting a plurality of digitally encoded data files, wherein the plurality of digitally encoded data files includes at least one digitally encoded data file belonging to a category identified in the user preference information for a user, for storage at the user's location;

a receiver receiving from the user an indication of a purchase of the stored digitally encoded data file, the digitally encoded data file including an anti-piracy ID tag; and a billing module using the indication of purchase to bill the user for the purchase of the digitally encoded data file.

32. A method of purchasing distributed digitally encoded data files comprising:

identifying a user preference comprising a category, wherein the category contains information identifying at least one digitally encoded data file belonging to the category;

receiving, via a blanket transmission, a plurality of digitally encoded data files including at least one digitally encoded data file belonging to a category identified in the user preference for the user;

automatically storing a transmitted digitally-encoded data file at a location of the user, if the digitally encoded data file belongs to a category identified by the user;

selecting a stored digitally encoded data file for purchase; and communicating the fact of the purchase to a central control system for billing the user.

33. A system for purchasing distributed digitally encoded data files comprising:

a user interface receiving an identification of a user preference comprising a category, wherein the category contains information identifying at least one digitally encoded data file belonging to the category;

a download module receiving, via a blanket transmission, a plurality of digitally encoded data files including at least one digitally encoded data file belonging to a category identified in the user preference for the user, and automatically storing a transmitted digitally-encoded data file at a location of the user, if the digitally encoded data file belongs to a category identified by the user;

a first input receiving a selection of a stored digitally encoded data file for purchase; and a transmitter communicating the fact of the purchase to a central control system for billing the user.

* * * * *